Aug. 4, 1959 R. RICE, JR., ET AL 2,898,175

DIGITAL PLOTTER

Filed April 11, 1955 16 Sheets-Sheet 1

INVENTOR:
Rex Rice, Jr.

By Herbert E. Metcalf
His Patent Attorneys

Aug. 4, 1959 R. RICE, JR., ET AL 2,898,175

DIGITAL PLOTTER

Filed April 11, 1955 16 Sheets-Sheet 2

INVENTOR:
Rex Rice, Jr.

By Herbert E. Metcalf
His Patent Attorneys

INVENTOR:
Rex Rice, Jr.
By Herbert E. Metcalf
His Patent Attorneys

INVENTOR:
Rex Rice, Jr.
By Herbert E. Metcalf
His Patent Attorney

Aug. 4, 1959 R. RICE, JR., ET AL 2,898,175

DIGITAL PLOTTER

Filed April 11, 1955 16 Sheets-Sheet 5

INVENTOR:
Rex Rice, Jr.

By Herbert E. Metcalf

His Patent Attorneys

DIGITAL PLOTTER

Filed April 11, 1955 16 Sheets-Sheet 6

INVENTOR:
Rex Rice, Jr.
By Herbert E. Metcalf
His Patent Attorney

Aug. 4, 1959 R. RICE, JR., ET AL 2,898,175

DIGITAL PLOTTER

Filed April 11, 1955 16 Sheets-Sheet 7

INVENTOR:
Rex Rice, Jr.

By Herbert E. Metcalf

His Patent Attorney

INVENTOR:
Rex Rice, Jr.
By Herbert E. Metcalf
His Patent Attorney

INVENTOR:
Rex Rice, Jr.
By Herbert E. Metcalf
His Patent Attorneys

Aug. 4, 1959 R. RICE, JR., ET AL 2,898,175

DIGITAL PLOTTER

Filed April 11, 1955 16 Sheets-Sheet 10

INVENTOR:
Rex Rice, Jr.
By Herbert E. Metcalf
His Patent Attorney

DIGITAL PLOTTER

Filed April 11, 1955 16 Sheets-Sheet 11

INVENTOR:
Rex Rice, Jr.
By Herbert E. Metcalf
His Patent Attorneys

DIGITAL PLOTTER

Filed April 11, 1955 16 Sheets-Sheet 12

INVENTOR:
Rex Rice, Jr.
By Herbert E. Metcalf
His Patent Attorneys

DIGITAL PLOTTER

Filed April 11, 1955 16 Sheets-Sheet 13

INVENTOR:
Rex Rice, Jr.
By Herbert E. Metcalf
His Patent Attorney

INVENTOR
Rex Rice, Jr.
By Herbert E. Metcalf
His Patent Attorney

DIGITAL PLOTTER

Filed April 11, 1955 16 Sheets-Sheet 15

INVENTOR:
Rex Rice, Jr.
By Herbert E. Metcalf
His Patent Attorney

INVENTOR:
Rex Rice, Jr.
By Herbert E. Metcalf
His Patent Attorneys

United States Patent Office 2,898,175
Patented Aug. 4, 1959

2,898,175

DIGITAL PLOTTER

Rex Rice, Jr. Palos Verdes Estates, Calif., Marion Ray Dilling, Seattle, Wash., and Graham Tyson, Los Angeles, Calif., assignors to Northrop Corporation, Beverly Hills, Calif., a corporation of California Application April 11, 1955, Serial No. 500,543

9 Claims. (Cl. 346—23)

The present invention relates generally to graph plotting devices and more particularly to a digital plotter that can be attached directly to digital computers.

The output of a digital computer is generally tabular. However, graphical records of all data in a time sequence, for example, are important and are usually adequate in accuracy for ordinary usage. Graphical records which are available simultaneously with the tabular output of a digital computer are also useful in the monitoring of calculated values to indicate trends in the output function. It is an object of this invention to provide a graph plotting device which can be attached directly to the output of a digital computer, or digital computer auxiliary equipment, to provide graphical output records therefor.

Digital computers operate ordinarily at high speeds. A plotting device attached directly to such a computer must be able to conform likewise in printing speed. It is another object of the invention to provide a high speed plotting device capable of performing, for example, a minimum of 10 excursion cycles per second, in which ordinate function values, for example, can be plotted at a rate of at least 10 points per second.

Another object of the invention is to provide a digital plotter which can be directly operated by calculator, keyboard or punch operation; i.e., a plotter which can accept input information at high electronic speeds, pulse rates in the 100 kilocycle per second range, or at slow manual speeds.

Among other objects of the invention are:

To provide digital plotting means in which a continuous paper feed is available.

To provide a plotting device in which reference grid lines, for example, a ¼ inch grid, can be provided simultaneously on blank recording paper with function plots.

To provide plotting means in which paper movement (feed) can be either forwards or backwards in integral space units of 0 to 99 increments of .025 inch, for example.

To provide plotting means capable of printing, for example, any of 400 equally spaced ordinate points between a 10 inch width of printable section.

To provide means for printing a plurality of curves on one graph or section thereof.

To provide a fully automatic plotting device for attachment to a digital computer.

Briefly, the foregoing objects are accomplished by providing a plotting device having a digital printing platen, rotatable on its axis, extending preferably across the full width of printing paper and comprising a multiplicity of printing sections. A series of projecting symbol points are suitably provided on each section and a plurality of printing hammers corresponding respectively with the platen sections are positioned to strike against the paper along the platen on a symbol point. Means for controlling the selection and printing of ordinate values by the orientation of the platen and firing of a hammer are provided for incremental spacing of printing paper.

These ordinate values are printed automatically according to the output from a digital calculator, from a series or parallel card punch or manually through hand keyboard operation. Means for controlling printing paper feed either forwards or backwards and at a variable increment spacing are also provided. A reference grid can be provided on blank printing paper along with function point plots.

The invention possesses other objects and features, some of which together with the foregoing, will be set forth in the following description of a preferred embodiment of the invention, and the invention will be more fully understood by reference to the accompanying drawings, in which.

Figures 3, 5A:
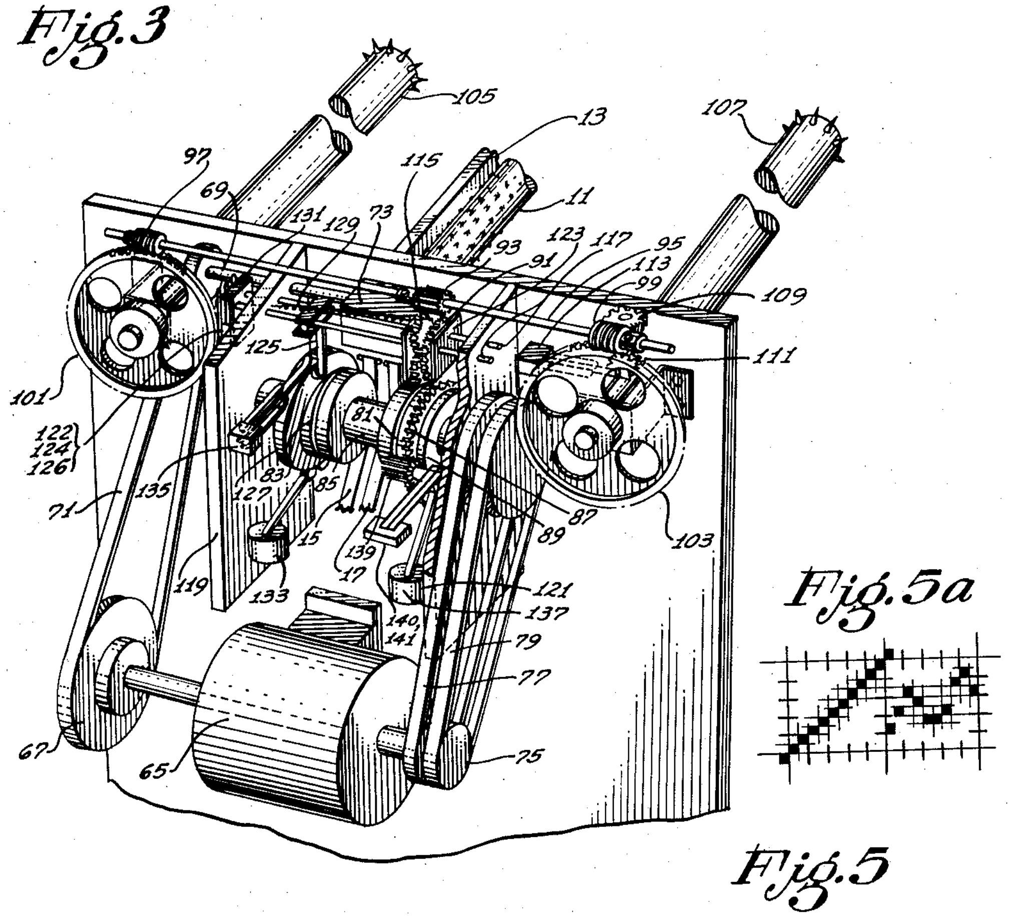
Figure 3 is a rear view of the digital plotter showing drive and switching mechanisms for the plotter in particular.
Figure 5:
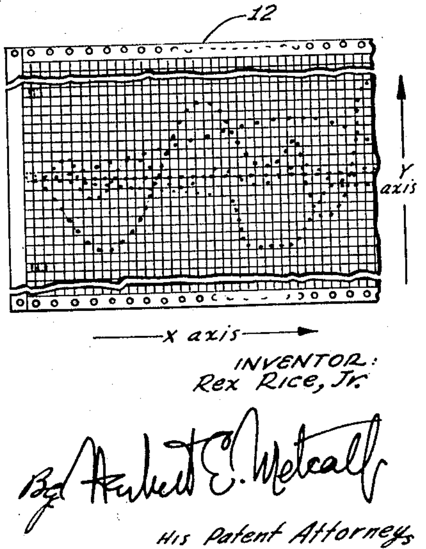
Figure 5 is a graph illustrating multiple curve plots on a section of printing paper.

Figure 5*a* is an enlarged view of a portion of the graph of Figure 5 to illustrate curve structure.

Figure 6:
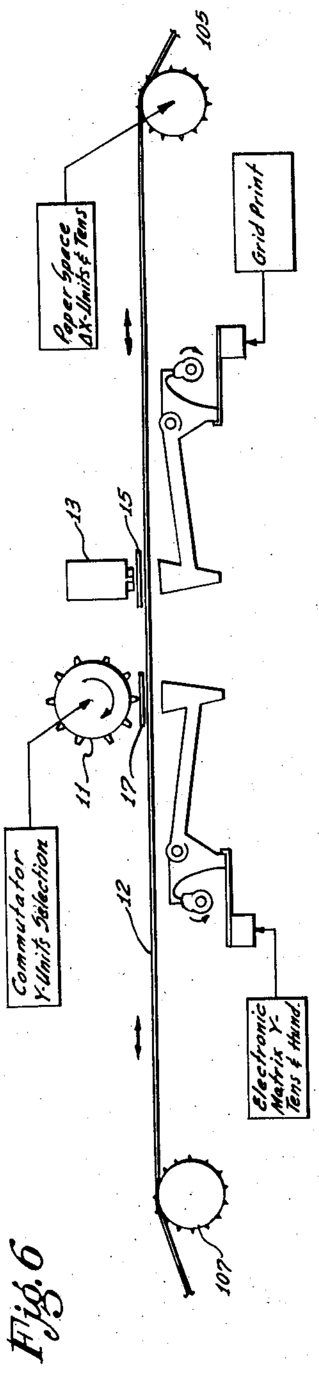

Figure 6 is a diagrammatic drawing showing basic essentials of the digital plotter.

Figure 6A:
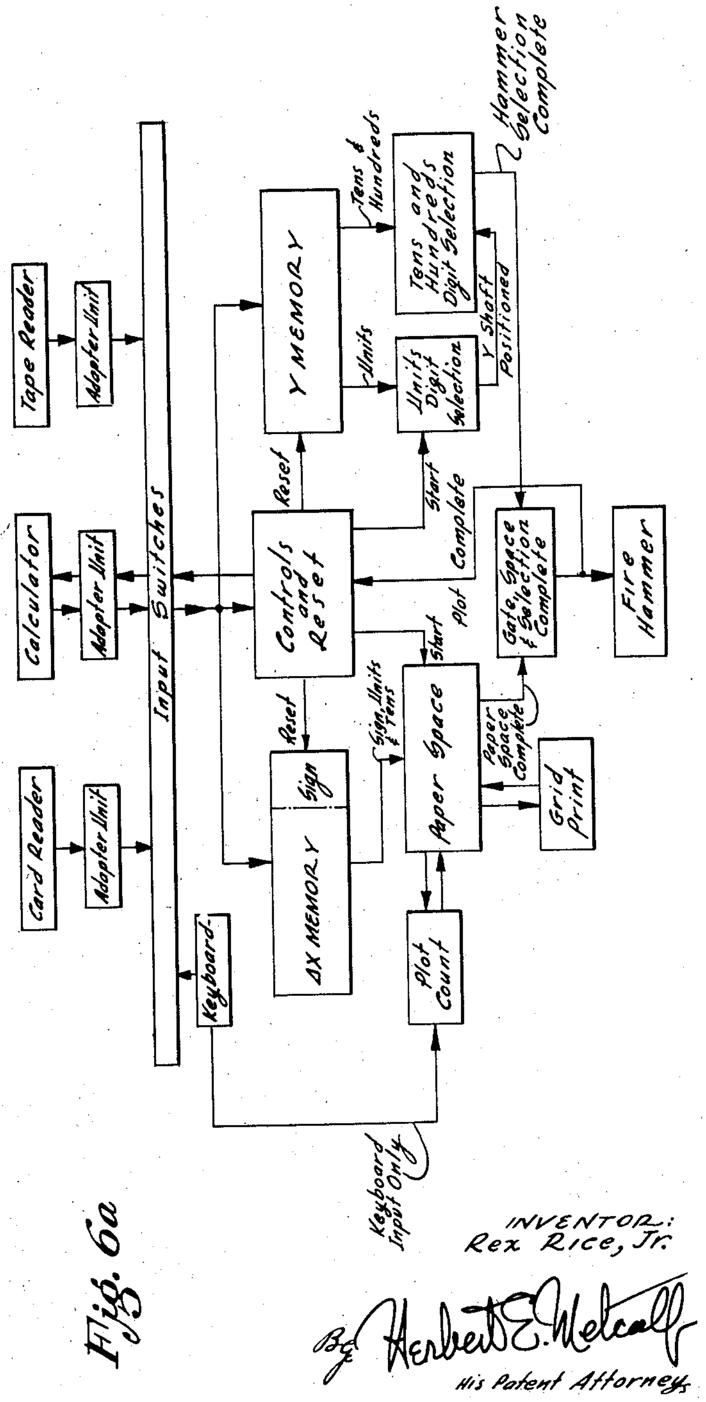

Figure 6*a* is a generalized block diagram of the invention.

Figure 7:
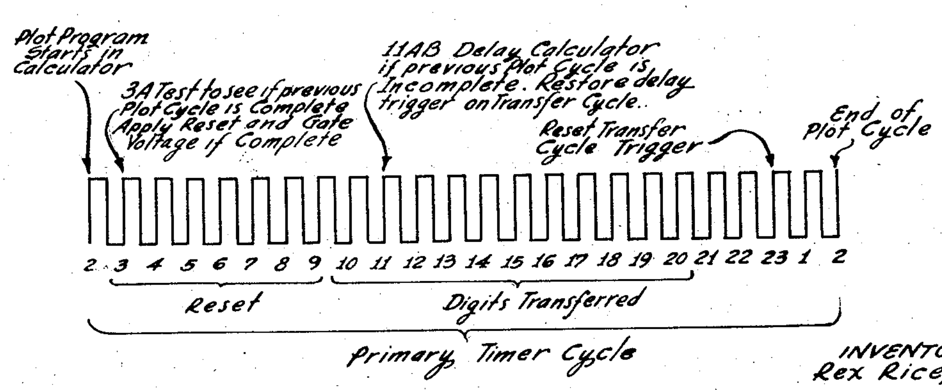

Figure 7 is a graph of a primary timer cycle reference wave generated in the calculator indicating various plotter functions occurring at different times of a plot cycle.

Figure 8:
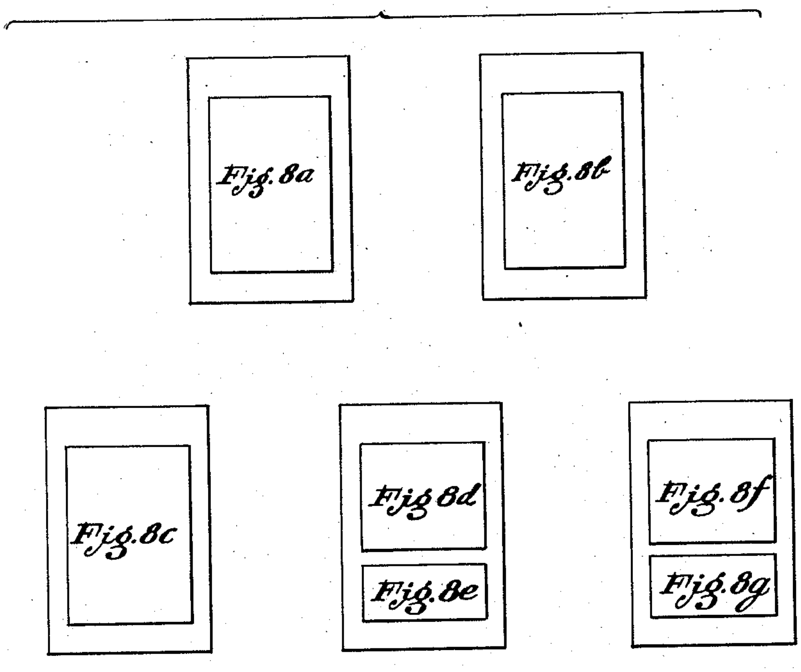

Figure 8 is an illustration of a general arrangement in which Figures 8*a* to 8*g* may be positioned for viewing the full circuitry of a preferred digital plotter.

Figure 8*a* through Figure 8*g* are broken and extended detail views of a preferred schematic of the invention.

Figure 9:
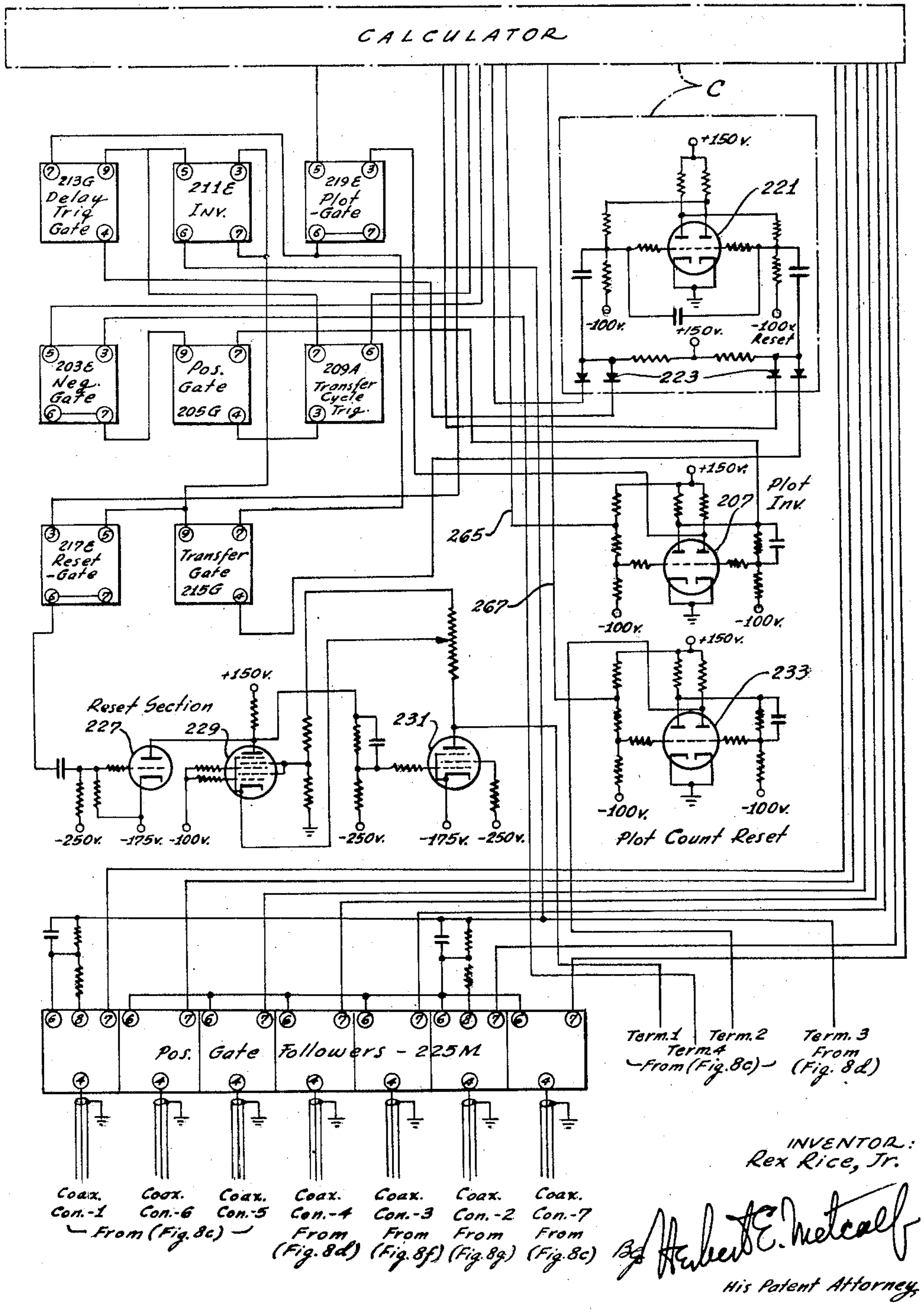

Figure 9 is a diagram showing the modification necessary for adapting connection of the digital plotter to a well known type of electronic calculator, for example.

Figure 10*a* through Figure 10*j* are drawings of preferred embodiments of various components employed in the structure of the digital plotter.

Figures 11, 11*a*, 11*b*, and 11*c* are graphs which illustrate plotter operation for the ΔX paper feed cycle.

Figure 12:
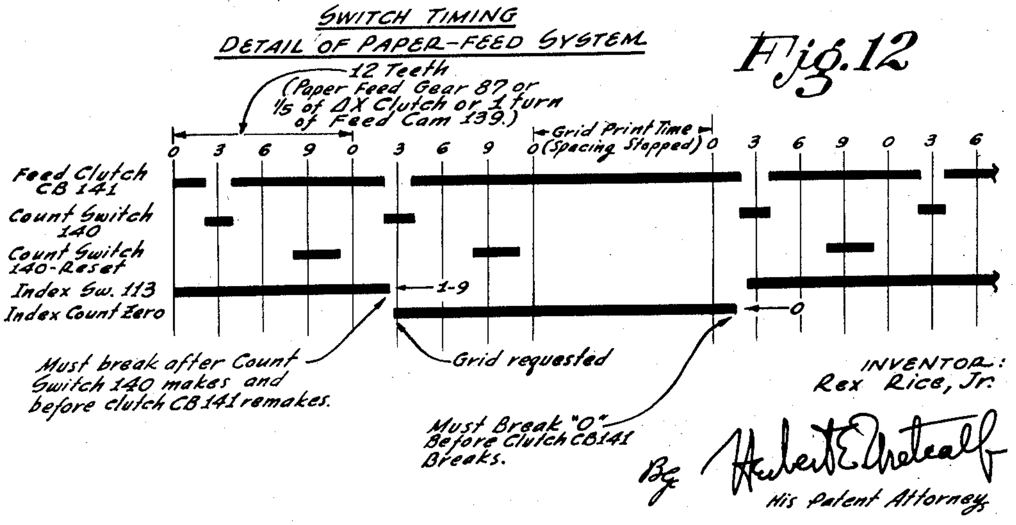

Figure 12 is a graph which shows switch timing details of the paper feed system for the plotter.

Figure 13:
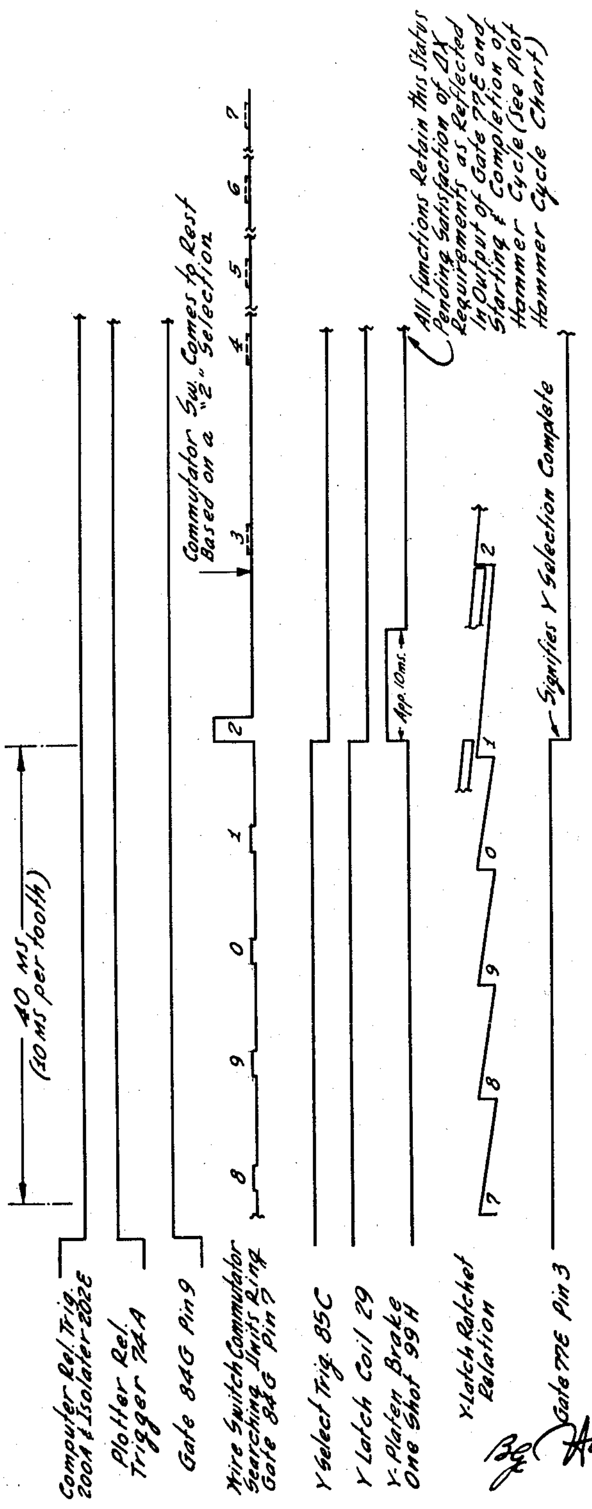

Figure 13 is a graph illustrating circuit behavior for the Y select cycle.

Figure 14:
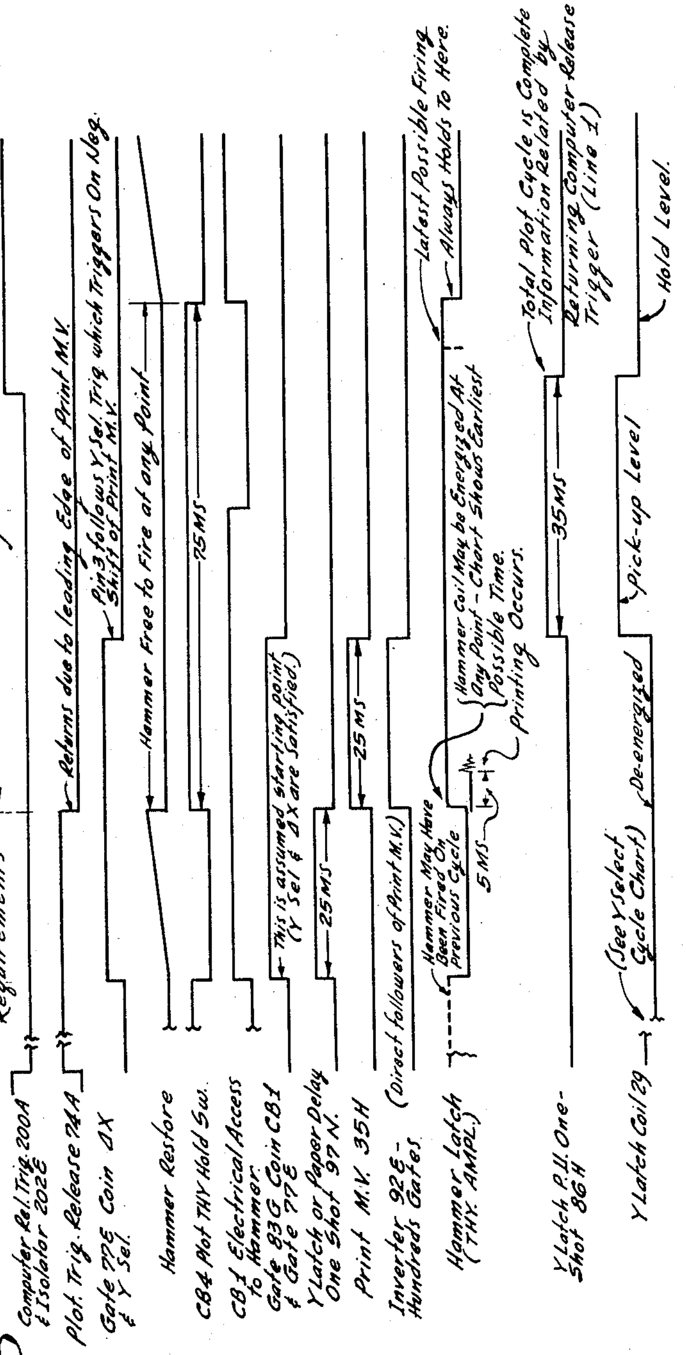

Figure 14 is a graph illustrating plotter operation for the plot hammer cycle.

Figure 15:
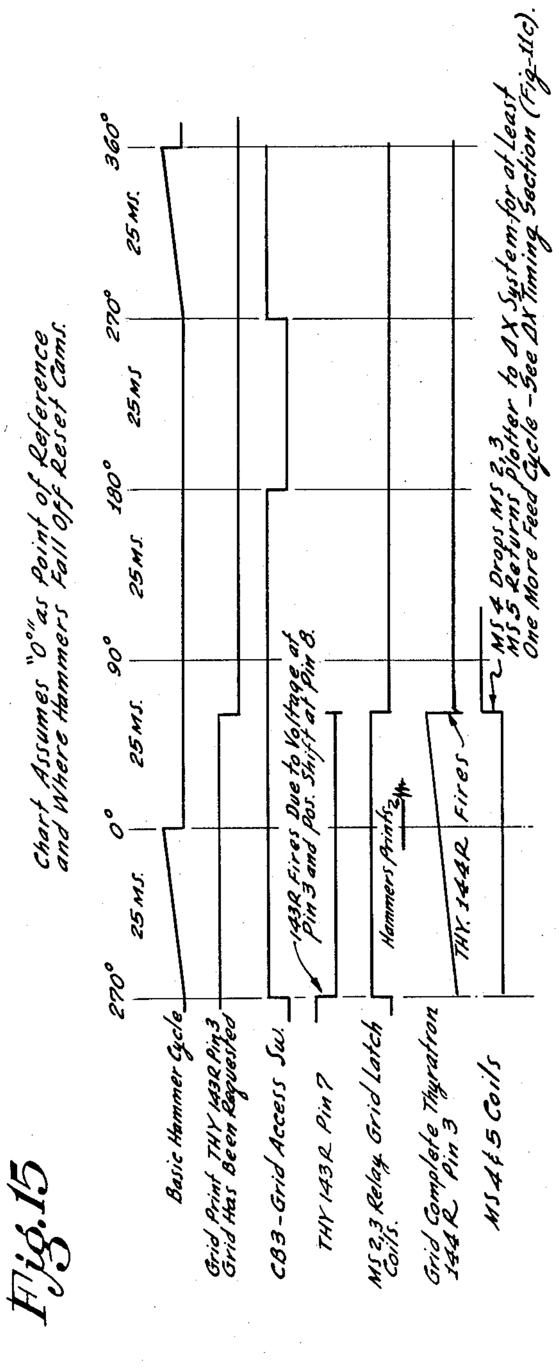

Figure 15 is another graph which illustrates plotter operation for the grid hammer cycle.

Figure 16:
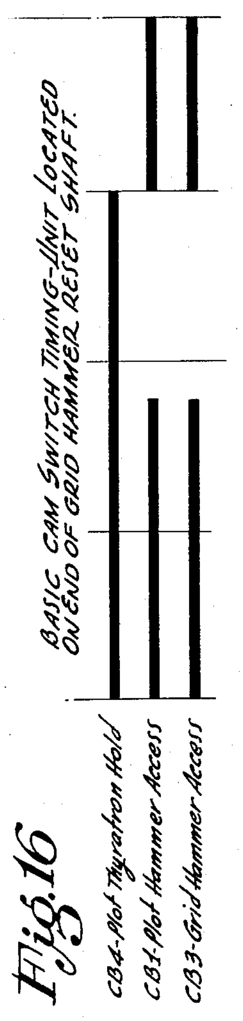

Figure 16 is a graph which shows switch timing details for printing control.

*General plotter description*

Figures 1, 2:
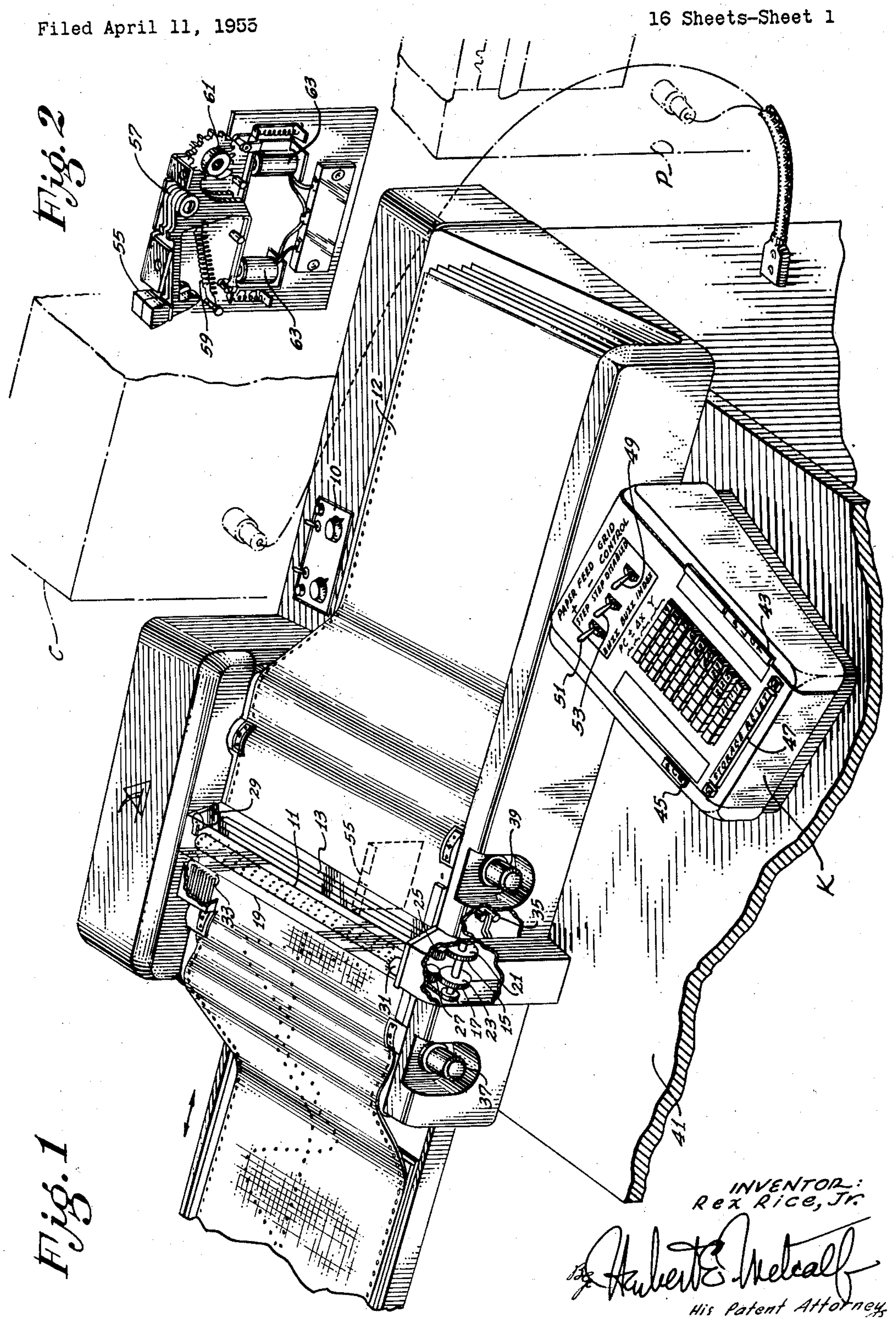
Figure 1 is a perspective drawing of a preferred embodiment of a digital plotter to illustrate the general arrangement of the plotter.
Figure 2 is a perspective drawing of a set of printing hammers used in the digital plotter.

The digital plotter is generally shown in Figure 1. The digital plotter is a graphical plotting device which can be operated manually through input from a hand keyboard K, automatically by attachment directly to the output of a digital computer such as, for example, an electronic calculator C, or from card readers such as card punch P. The three selections available for operating the plotter—by keyboard, calculator or punch—can be made by operating a pair of selector switches on panel 10 located on the body of the plotter. Under any of the chosen modes of operation, abscissa movement (paper feed) can be controlled by the same source governing ordinate selection, or from the keyboard.

Referring to Figure 1, a printing head—a platen 11 extends crosswise at right angles to the direction of paper motion (feed) fully over the paper which can be moved positively (from right to left) or negatively (from left to right). The printing paper 12 is preferably fan-folded along vertical perforations so that a section can be separated if desired. This paper or vellum is sprocket driven and passes under a grid print bar 13 and the platen 11. The platen 11 is preferably a metallic roller which normally is constantly rotated through a friction drive. There can be 400 symbol points, equally spaced, which encircle the platen 11 helically at a constant pitch. The platen 11 and grid bar 13 can be enclosed by a cover 19 which is transparent in this instance. Two ink ribbons 15 and 17 run respectively under and along the length of the grid bar 13 and platen 11, over the paper. The ink ribbons 15 and 17 are carried respectively on reels 21 and 23 and are maintained in tension through friction rollers which tend to drag or pull the ribbons. Reels 21 and 23 are free to rotate but are restrained by the armatures of a grid ribbon relay 25 and a plot ribbon relay 27, respectively. The ribbons are permitted to feed when these relays are de-energized, disengaging the armatures.

The platen 11 is normally frictionally driven continuously but can be stopped at any time by de-energizing a Y-latch relay 29 and energizing a brake solenoid 31 which is geared to platen 11. A Y-units commutator 33 is also geared to the platen 11 at the back end thereof. Beneath the paper are 42 hammers which are equally spaced and positioned to strike along the axis of the grid bar 13, each hammer head covering ¼ inch along the printing paper width. The hammers strike the paper against grid bar 13 through ink ribbon 15. Similarly, there are 40 individual hammers located to the left of the grid hammers and positioned to strike along the axis of the platen 11. These hammers strike the paper against symbol points on platen 11 through ink ribbon 17. For each ¼ inch working length of platen there is a series of raised symbol points which circle the roller in a helix. There can be 10 points per ¼ inch and, for the full printable paper width of 10 inches, there are thus the 400 points capable of spanning the paper width.

The hammer reset drive shaft which cocks the grid printing hammers is also geared to drive a cam 35 having three contour sections which operate three circuit breaking switches identified as CB–1, CB–3 and CB–4, respectively. The function of these switches is to time the firing of the hammers. CB–1 is the plot hammer access switch which controls the time at which a plot hammer can be released so that hammer resetting means does not prevent the striking of the hammer on the platen. Similarly, CB–3 is the grid hammer access switch and governs the release of the grid hammers. CB–4 is a plot thyratron hold switch which times the application of plate voltage to plot hammer thyratrons. The printing paper 12 struck by the hammers is normally incrementally driven by power; however, the paper can be manually adjusted and positioned by engaging and operating the left or right hand knobs 37 and 39. The paper driving mechanism is shown in Figure 3 and will be described later.

The hand keyboard K is located on the desk portion, shelf 41, of the plotter and is electrically connected to the plotter body by electrical leads (not shown). Manual controls on the keyboard include nine rows of keys arranged in seven columns. The keys in a column are numbered in sequence from 1 to 9 inclusive as shown. The first three columns on the right are labeled Y and refer to the ordinate function value along the vertical axis in the plot of a graph. In this instance, the 400 equally spaced points span the width of printing paper on a vertical axis and range in value from 0 to 399. Thus, three-decimal digits for these values can be set up in the first three columns of keys, a column being provided respectively for the units, tens and hundreds digit which identify an ordinate function value along the axis of the platen. A zero value is the condition wherein none of the keys in a column is operated.

The next two columns are labeled ΔX which refers to the incremental horizontal movement of paper feed along the abscissa or horizontal axis X of a plot. Paper feed is made in discrete increments which are integral units of from 0 to 99 multiples of .025 inch, for example. Two-decimal digits between the values of 0 and 99 identify the unit size of a discrete increment of ΔX and can be set up in these two ΔX columns of keys. The sign which determines the direction of paper feed is provided by the next column of keys. Depressing the "one" key will give a negative ΔX paper feed and a positive ΔX feed is provided when none or any other of the keys in this column is depressed. Clearing of the keyboard by pressing one of the corner keys labeled C will automatically produce a positive ΔX condition. Any ΔX and plot count information already provided to the plotter storage units or memory, however, will not be altered by subsequent keyboard clearance through use of the keys labeled C.

The last column of keys is labeled PC and is the keyboard control for a plot count storage or memory. This plot count device allows a plurality of ordinate plot points to be made before the paper space increment which has been set in the ΔX keyboard section is activated. This device is used with a uniform ΔX spacing where the ΔX increments are equal and can allow from 1 to 8 curves to be plotted with a four stage plot count binary counter, for example. Ordinate signals only are provided from a calculator, for example, and paper spacing control is preferably provided from the keyboard in this instance. It is possible to achieve multiple curve plotting without the use of the plot count device by sending zero values for ΔX with as many ordinate values as desired from a calculator before a particular ΔX value is then provided. In this way, all the ordinate values for a given abscissa are plotted before the paper is spaced. Another method for plotting multiple curves is by plotting one curve and then reversing the paper feed to the start point and plotting another curve at a different time.

A plot key 43 is provided in the form of a bar located on the right side of the keyboard. This key, when depressed, can be used to manually start a plot cycle. A plot count reset (PCR) key 45 is located on the left side of the keyboard and is operated to reset the plot count storage to an initial condition. Similarly, a storage reset key 47 is a bar along the lower end of the keyboard and can be operated to reset ΔX and Y storages to initial condition. The ΔX and Y memories are one cycle storages and are described later. Paper feed control and grid control are provided by three switches located above the keyboard section. By actuating the grid control switch 49 from central position upwards, grid printing can be suppressed. Throwing switch 49 downwards from central position will rapid space and index the paper positively to the nearest vertical grid line. The paper is moved from right to left until the paper is properly located for the next grid printing operation. This is, for example, exactly 50 spacing increments away from the symbol printing position. Switches 51 and 53 are manual paper feed controls for moving the paper in a positive or negative direction, respectively. Actuating one of these switches upwards will cause the paper to make a single step of an increment unit space (.025 inch) for each switch operation. Placing a paper feed switch in a downward position will buzz the paper or produce a continuous paper feed so long as the switch is held in this position. Paper feed speed is, for example, 50 space increments a second.

A pair of printing hammers in a preferred assembly embodiment is illustrated in Figure 2. There are 41 sets of such assemblies which are positioned, 20 on the symbol side and 21 on the grid side. They are adjacent to each other and in line under the grid bar 13 and printing platen 11 (Figure 1) such that the hammer heads strike along the axis of each element. The hammers 55 are preferably fabricated from nylon and can be shaped as illustrated in Figure 2. Two hammers are mounted on a single pivot 57 and are urged upwardly by springs 59 which connect to the hammer pivot arms. The rear end of the hammers are shaped to cooperate with a geared cam member 61. This cam 61 is driven off a hammer reset drive shaft (not shown) and is rotated to cock the hammers by causing the hammers to pivot downwardly such that the ends of their pivot arms engage with the spring loaded armatures of relays 63. When a relay is energized, the armature thereof is moved downwards releasing the cocked hammer such that it strikes up at a symbol point on the platen or a ¼ inch wide space on the grid bar, for example. It is noted that a hammer cannot be tripped during the time when the cam 61 is engaging the hammer rear end, which would prevent movement of the hammer.

Figure 3 is a back view of a portion of the digital plotter to illustrate the driving and various control mechanisms for the plotter. A drive motor 65 is run at a constant speed when energized. Pulleys are affixed on both ends of the drive shaft as shown. The left end pulley 67 drives a shaft 69 by means of belt 71. Shaft 69 engages with gearing 73 which, in turn, rotates platen 11 by means of a friction drive (not shown). Similarly, the right end pulley 75 has two belts 77 and 79 which jointly drive two friction clutches 81 and 83 affixed to shaft 85. The right clutch 81 frictionally drives gear 87 and cam 89 affixed thereto. This gear 87 meshes with idler gear 91 which, in turn, engages with a wide gear 93 secured to paper drive shaft 95. Worm gears 97 and 99 secured to the ends of shaft 95 mesh respectively with gears 101 and 103 which turn the sprockets 105 and 107 to move the printing paper. Worms 97 and 99 have a sine wave thread to produce a sine wave acceleration and deceleration of the paper. A pinion 109 meshes with worm 99 and index cam 111 attached to the pinion 109 shaft operates index switch 113. This index cam 111 makes one revolution for every 10 revolutions of the paper drive shaft 95.

Reverse idler gears 115 are engaged with gear 87 when the idler gears 91 and 115 are shifted to the right by movement of support rods 117 journaled in side plates 119 and 121. The idler gears 91 and 115 are rotatably supported by a U-bracket 123, which is affixed to the support rods 117. Also affixed to rods 117 is an arm 125, the end of which works on the side of wedge-shaped cam 127. The U-bracket 123 is attached to side plate 119 by a spring 129 which urges the idler gears to the left, idler gear 91 normally meshing with gear 87. The wedge-shaped shift cam 127 forces arm 125 to the right when actuated to shift rods 117 carrying U-bracket 123 to the right such that only the reverse idler gears 115 will mesh with gear 87 to reverse the direction of paper feed. Three switches 122, 124 and 126 are located at the left end of the rods 117 and are operated by movement of a bracket 131 attached to the ends of rods 117. These are shift control switches for the plotter.

The wedge-shaped cam 127 is actually two cams in one. The circular periphery of the cam is shaped to another cam which engages with the armature of a shift latch relay 133. The armature prevents rotation of cam 127 by latch action causing friction clutch 83 to slip. When relay 133 is energized, however, the armature is pulled away from the cam 127 thus permitting clutch 83 to drive the cam 180 degrees and shift the idler gears 91 and 115. A shift interlock switch 135 also works along the periphery section of cam 127. Similarly, the feed gear 87 is permitted to rotate whenever feed latch relay 137 is energized drawing the armature thereof away from the periphery of feed cam 89, allowing the friction clutch 81 to stop slipping and drive feed gear 87. A small gear 139 also meshes with feed gear 87 as shown and the shaft thereof is cam shaped (feed cam) to operate feed control switches 140 and 141. Ink ribbons 15 and 17 for the grid bar 13 and platen 11 pass between slipping drive rollers (not shown) and are gathered in a waste receptacle.

Figure 4:
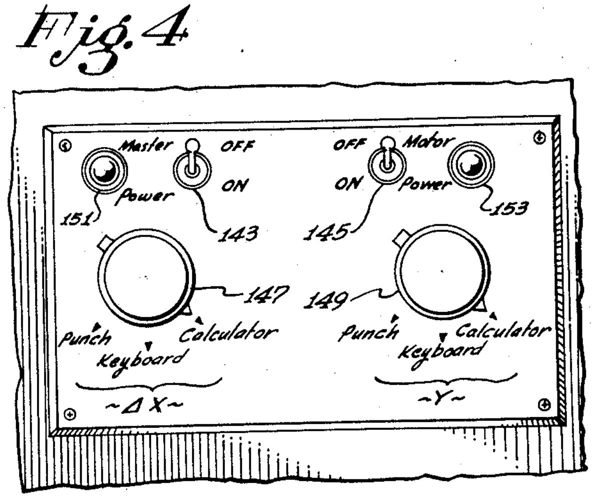
Figure 4 is an enlarged view of the plotter function selector switch control panel.

The selector switch panel 10 (Figure 1) is more clearly shown in an enlarged plan view in Figure 4. A master power switch 143 is provided with a motor power switch 145 which controls power to the motor 65 (Figure 3). Indicator lamps 151 and 153 are respectively provided with power switches 143 and 145. Selection of the input device which originates the signal for paper feed increment control, the ΔX function, is made by operation of selector switch 147 and selection for ordinate information, the Y function, is similarly controlled by selector switch 149. Input may be either from a calculator, or from keyboard or from a card reading machine.

The plotter is capable of making plots as shown in Figure 5 which is an illustration of plotted points which represent curves. A section of a multiple curve plot is shown in this figure. The paper 12 is punched with holes along the edges which are engaged by the paper feed sprockets. The grid printed by the grid print bar 13 is preferably a ¼ inch grid over which ordinate points are printed. The paper width is approximately 11 inches wide, the plot width being preferably 10 inches. A reference axis (straight line) can be plotted along the center of the paper and can be labeled 0 at the beginning thereof. Other horizontal grid lines can be suitably calibrated and identified. These markings can be printed by the plotter by proper programming of calculator input information, for example.

The details of the plots are more clearly shown in Figure 5*a* which is a greatly magnified portion of Figure 5. The symbol points shown in this figure are observed to be square points although other symbols such as a circular dot or triangle are equally good. In this respect, the platen 11 can be easily constructed having a plurality of different symbol points. For example, a series of different symbols can be provided around the platen, each symbol point being restricted, however, to a different sector on the roller. It is also possible to alternate the symbols in a series, the symbols being cyclically varied in succeeding sectors on the roller. The points in Figure 5*a* have been illustrated for a ΔX spacing of 1 which is .025 inch, in this instance. A ΔX spacing of 2, for example, would yield the same number of points but they would appear at every other interval in the X direction. This interval is variable from 1 to 99 as is desired, and may be set in the keyboard as a constant or may be continuously variable from point to point by input from whatever device is used to feed the plotter.

Reference is made now to Figure 6 which is a schematic diagram designed to illustrate fundamental aspects of the invention only. This is, in substance, a front cross sectional view of the digital plotter shown in Figure 1. The paper 12 is driven by the sprockets 105 and 107 and pass over the two banks of hammers for grid printing and function ordinate plots. Each bank of hammers is schematically indicated by a single hammer since the hammers are set in line along the axes of the platen 11 and grid bar 13. Ink ribbons 15 and 17 run parallel to the axes of the grid bar 13 and platen 11, respectively, over the paper as shown.

The paper 12 is spaced positively or negatively in accordance with ΔX units and tens input data provided for each plot cycle. This is indicated by the block labeled "Paper Space" in Figure 6 schematically shown associated with sprockets 105 and 107 which move in unison. The grid is printed once every ten space increments of ΔX by the firing of all the grid hammers at the proper time. The hammers produce a grid on paper 12 by striking against grid bar 13 through both the paper 12 and ink ribbon 15. The hammers are cocked and reset by continuously rotating cams and the timed release of these grid hammers is indicated by the block labeled "Grid Print" shown associated with the grid hammers.

Platen 11 is correctly oriented according to Y units input data by means of commutator mechanism schematically indicated by the block labeled "Commutator" associated with platen 11. The particular plot hammer that is fired is determined by Y tens and hundreds input data which select a particular hammer thyratron of an electronic (thyratron) matrix. This is also indicated in Figure 6 by the block labeled "Electronic Matrix" shown associated with the plot hammers. Both the Y units selection and the Y tens and hundreds selection must be completed before a plot hammer can be fired against an ordinate point through paper 12 and ink ribbon 17. A plot hammer must be released at a proper time since the plot hammers are cocked and reset by continuously rotating cams.

It is understood, of course, that the various elements shown in Figure 6 have mutual effects, although the drawing does not specifically illustrate this. For example, the paper space means must obviously affect the grid print means, and a plot hammer is not fired unless the commutator (Y units selection) means is established along with the establishment of the electronic matrix (Y tens and hundreds selection) means in conjunction with the spacing (ΔX feed) being complete.

A general block diagram of the invention is shown in Figure 6*a*. This is a single line diagram in which the invention is functionally arranged and depicted. Different sources of input data are shown above the elongated block labeled "Input Switches" and require adapter units to connect them with the digital plotter. The input switches can be operated to select any one of these sources for input to the plotter. Input sources include a card reader (punch), calculator, tape reader, and the like. In addition, the input switches can select keyboard operation for the plotter, in which instance the input data is provided manually by means of the hand keyboard integrally attached to the plotter.

The digital plotter receives input signals which consist of the ΔX, or paper feed increment information which can be any digital value from 0 to 99 together with its associated sign indicating paper feed direction; the Y, or ordinate, information which can be of any digital value from 0 to 399, in the embodiment shown, for one input cycle; and a plot signal. The plotter executes the command by accomplishing the paper spacing increment. ΔX in the proper direction first and then plotting the ordinate or Y information. The plotter has one-cycle storages or memories for the ΔX and Y function information received from a calculator. The calculator is not held up unless a second plot command is received before the plotter has finished executing the previous plot command. The Y function one-cycle storages are not used when Y information is fed from the keyboard. It should be noted that Y information can be fed from an external source (calculator, punch, etc.) while a constant ΔX is fed from the keyboard, or both Y and ΔX can be provided from the keyboard.

In Figure 6*a*, input data is provided to the ΔX memory and the Y memory from the input sources shown. The ΔX memory includes a section for sign control. Control signals are provided to the controls and reset means and when the plotter is ready to plot and a plot cycle is called for, the memories are reset to an initial condition after which the calculator or punch provides ΔX and Y data to the two memories in the form of digital pulses which are stored for one plot cycle. With keyboard operation, the keyboard comprises the Y memory by retaining the setting of the Y function keys.

When operating with a calculator a ready signal is originated in the control means when the plotter is ready for the next plot. If the plotter is not ready when the calculator calls for a plot, the calculator is so informed and the calculator program is delayed. The start signal which comes from the calculator initiates the paper space mechanism which spaces the paper in accordance with the content of the ΔX memory (including sign).

The paper space mechanism is controlled also by a plot count device which allows multiple curves to be plotted simultaneously by suppressing paper spacing until all ordinate points for a particular abscissa value is plotted. The plot count device has keyboard input only, in this embodiment, and ΔX memory data is preferably also supplied through the keyboard when using the plot count feature. The content of the plot count device is changed a digit for each ordinate point plotted until the number of points plotted is equal to the number set in by the keyboard whereupon paper spacing is again permitted and the plot count device can be reset on the next plot cycle.

The paper space mechanism indirectly controls grid print in the plotter by causing a grid to be printed for every 10 space increments of paper feed. Each time a ΔX paper excursion is completed, a signal is also provided to gate means which permit the firing of a plot hammer when both ΔX paper spacing and Y ordinate selection are complete. This latter function (Y selection) is accomplished according to the content of the Y memory. The start signal which started paper spacing also allows the platen to be stopped in a position (orientation) controlled by the units digit from the Y memory. The positioning of the Y shaft (platen) and the fulfillment of plot hammer selection by electronic matrix according to Y tens and hundreds data yield a hammer selection complete signal which in conjunction with the spacing complete signal permits firing of the selected hammer.

When the plotter is operating from the calculator, the digital data pulses provided to the plotter are originated in the calculator and are governed timewise in appearance according to a primary timer cycle. This reference signal is illustrated in Figure 7. Points along the primary timer cycle are identified by numbers, each number representing a pulse repetition cycle. In the timer signal shown, there are 23 cycles in which the first half of a cycle is labeled A and the second half cycle is labeled B. Thus, 3A refers to the time of voltage rise from point 3 to the next voltage fall point, and 3B would refer to the time from this point of voltage fall to the next point of voltage rise (beginning of 4A). In line with this designation then, 11AB represents the time of a full cycle starting from point 11 and ending at the beginning of point 12. Calculator digit pulses correspond to the A and B portions of each cycle. During a half cycle, a pulse or no pulse represents whether data is present or absent, respectively, at that time.

The plot program starts in the calculator at the beginning of 2A time, for example, and the appropriate voltages are developed in the calculator from 2A of one cycle until 2A of the next cycle, one complete cycle of the primary timer. At 3A time, a computer release trigger (200A) in the plotter is tested by the calculator program to see if the plotter is ready for plotting. If the previous plot cycle is complete, reset and gate voltages are applied to the plotter from the calculator, the reset interval being from 3A to 3B. The sign of a digit is transferred at 9A time and the digits are normally transferred from 12A to 20A time (9 pulses) to the ΔX memory and from 11B to 19B (9 pulses) to the Y memory. If at 3A time the programmed test of the computer release trigger in the plotter finds that the plotter has not completed a previous plot program, the calculator is held in this program step until the plotter is ready.

*Plotter schematic diagram*

Referring now to Figure 8, there is shown a general arrangement in which the several broken and extended views of a preferred schematic of the digital plotter may be positioned for viewing as a whole. This figure, in its entirety, is contained on five separate sheets and comprises seven different figures including Figures 8*a* through 8*g*. The last two sheets carry two figures each.

Figure 8A:
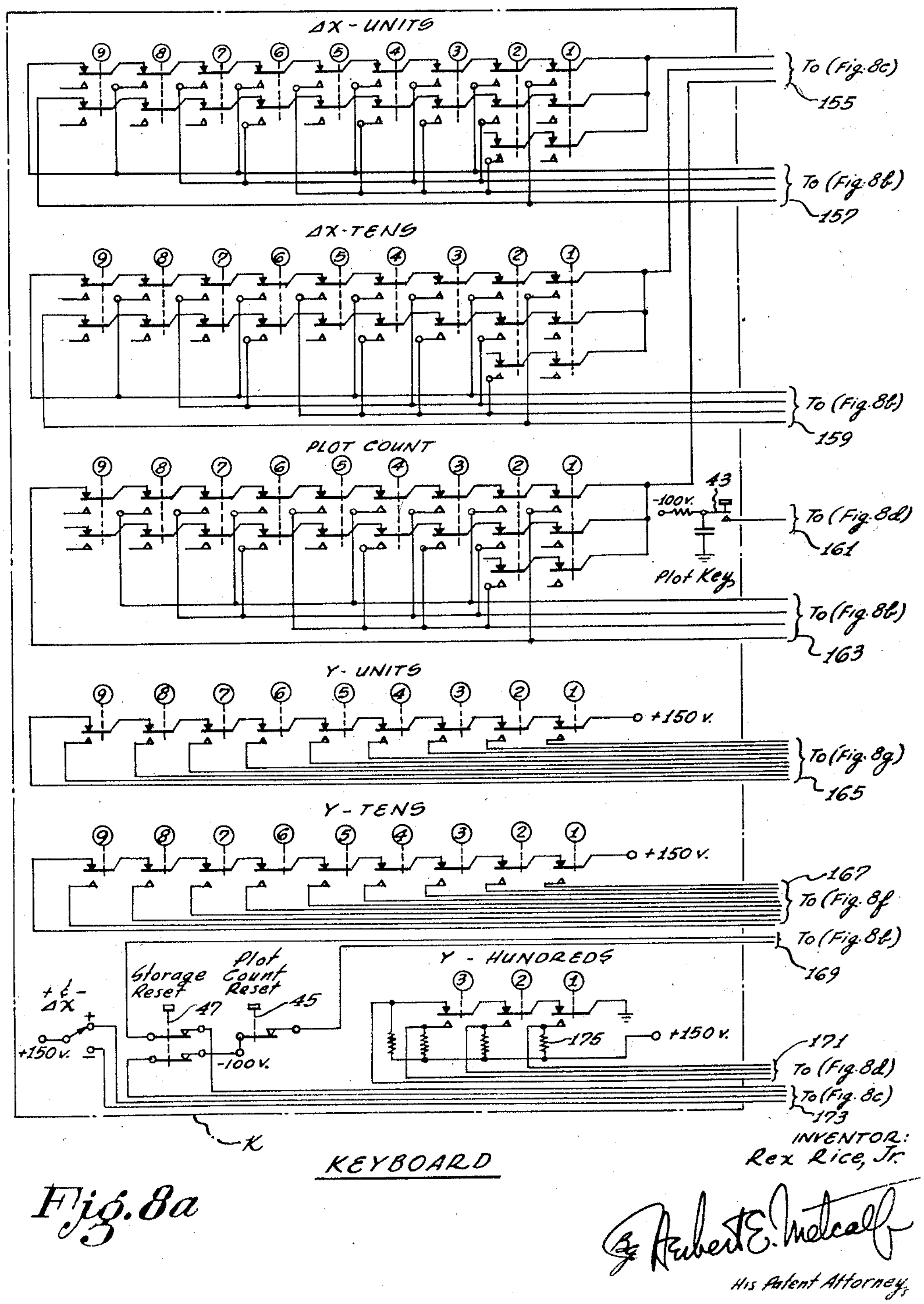

In Figure 8*a*, the hand keyboard K is schematically shown. This is a conventional keyboard which is wired as shown for suitable plotter operation from a hand keyboard. The keys for each function group range in value from 1 to 9 inclusive, as indicated by the circled numerals, a 0 value being the condition wherein none of the keys in a group is depressed. The first group of keys is labeled "ΔX-units," the second group labeled "ΔX-tens" and a third group is labeled "plot count." In addition to these three groups, there is a Y function set of keys in which there is a "Y-units" group, a "Y-tens" group and a "Y-hundreds" group connected as illustrated. Only three keys for the "Y-hundreds" group are required in this instance. There are four other switches shown, a "plot count reset" switch 45, a "storage reset" switch 47, a "plot key" switch 43 and a "+ & —ΔX" switch. This latter switch is the "one" key of the column of keys labeled ± in Figure 1 and produces a —ΔX paper feed condition when this key is depressed. Clearing the keyboard automatically produces a +ΔX switch condition.

The "ΔX-units" group of switches operated by the keys are wired identically as the switches for the "ΔX-tens" and "plot count" groups. The "9" key of the plot count group differs in that it is wired like the "1" key when the former key is operated. Similarly, the switches for the respective "Y-units," "Y-tens" and "Y-hundreds" function groups are wired alike with the exception that voltage dropping resistors 175 are included in the "Y-hundreds" circuitry as shown. The keys for a particular group are mechanically interlocked, i.e., only one key can be depressed at any one time. Output wiring to other equipment (shown in other figures) are grouped together and are identified as such by a single reference character. For example, wire groups 155 and 173 lead to apparatus in Figure 8*c*, wire groups 157, 159, 163 and 169 lead to Figure 8*b*, wire groups 161 and 171 lead to Figure 8*d*, wire group 165 leads to Figure 8*g* and wire group 167 leads to equipment in Figure 8*f*. The individual wires in a group will be identified by adding a letter to the group reference character in proper sequence for wires beginning from top to bottom or from left to right in a wire group. Thus, 155*a* refers to the first (top) wire of wire group 155 and 173*d* refers to the last (bottom) wire in wire group 173, in Figure 8*a*.

This description of the digital plotter is intended to parallel the functional arrangement given in Figure 6*a*. For this reason, reference is made jointly to Figures 8*a*–8*g* as well as Figure 9 and Figures 10*a*–10*j* as necessary in the ensuing description.

Figures 10A, 10B, 10C, 10D, 10E, 10F, 10G, 10H, 10I:
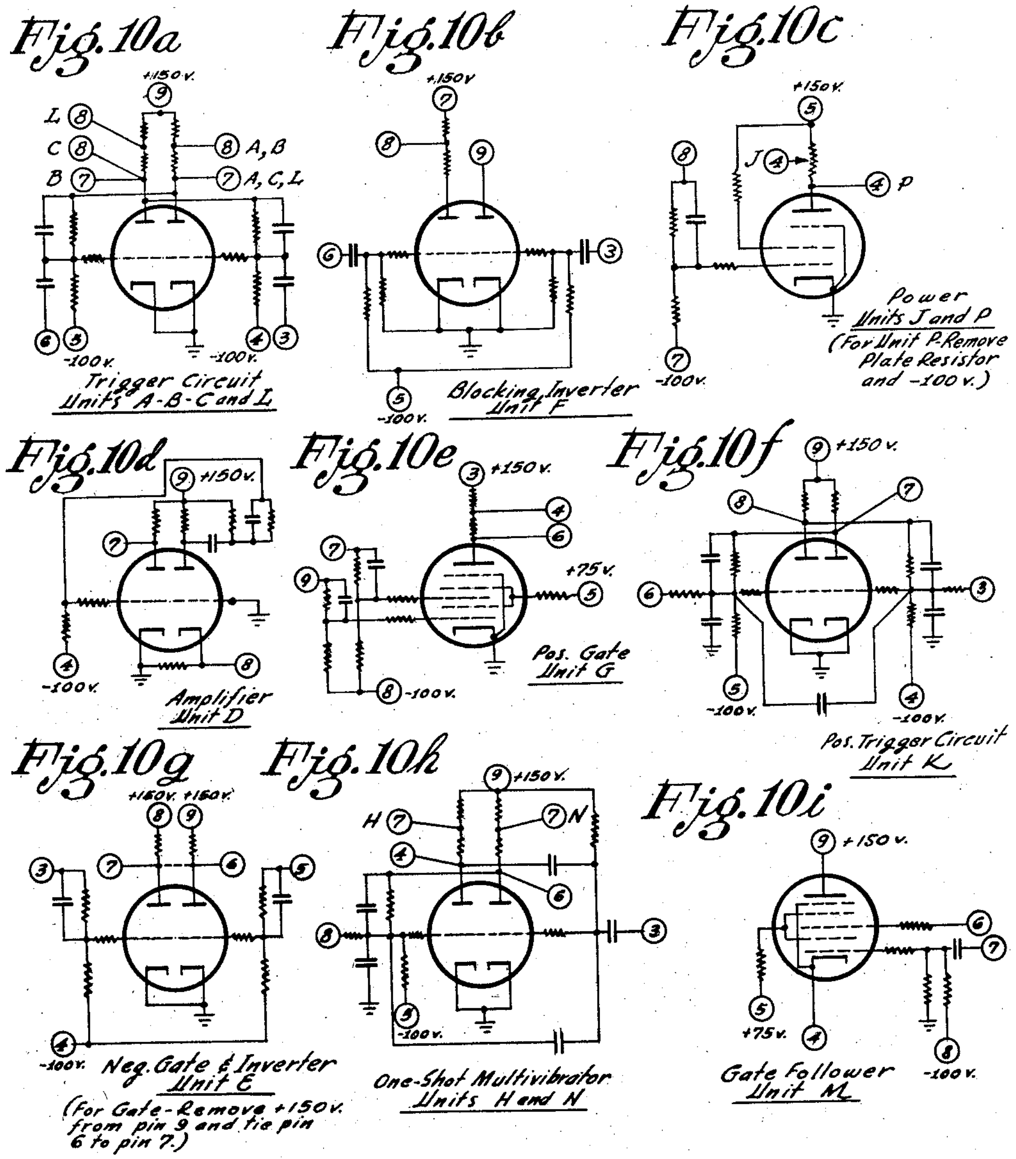
Figure 10J:
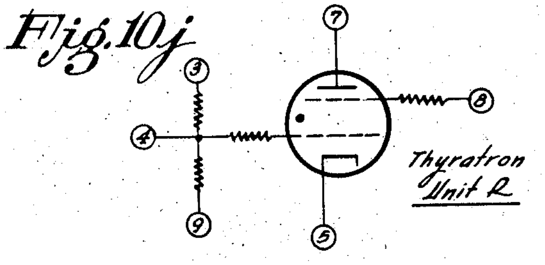

Detail construction of the various components utilized in the digital plotter are shown in Figure 10*a* through Figure 10*j*. Pin numbers are indicated by the circled numbers and the different elements are identified by capital reference letters from A to R which are the end letters of the reference characters in other figures. By means of these figures, the circuitry for the digital plotter can be fully reproduced. These are well known, conventional circuits which are, however, particularly constructed and adapted for suitable use in the plotter. A detailed description of these circuits is not believed necessary since the circuits are all well known and their operation is readily apparent. Figure 10*a* shows a preferred circuit for trigger circuits used in the digital plotter. Units A, B, C and L, provide different connections for different places in the digital plotter. A trigger is considered "on" when the left side is conducting. Figure 10*b* shows a preferred circuit for a blocking inverter which is labeled unit F. Figure 10*c* shows power amplifier units J and P and Figure 10*d* is a circuit for an amplifier unit D. Figure 10*e* is a detailed circuit for a positive coincidence gate, unit G. A positive trigger circuit, unit K, is shown in Figure 10*f* and a combined negative coincidence gate and inverter circuit is shown as unit E. Units H and N for one-shot multivibrators are illustrated in Figure 10*h*, a gate follower circuit, unit M, is shown in Figure 10*i*, and a thyratron circuit, unit R, is shown in Figure 10*j*. These units are fabricated as plug-in elements and are readily replaceable for service and repair. Thus, the block diagram for the digital plotter is actually a detailed, as well as a schematic block diagram.

Figure 8B:
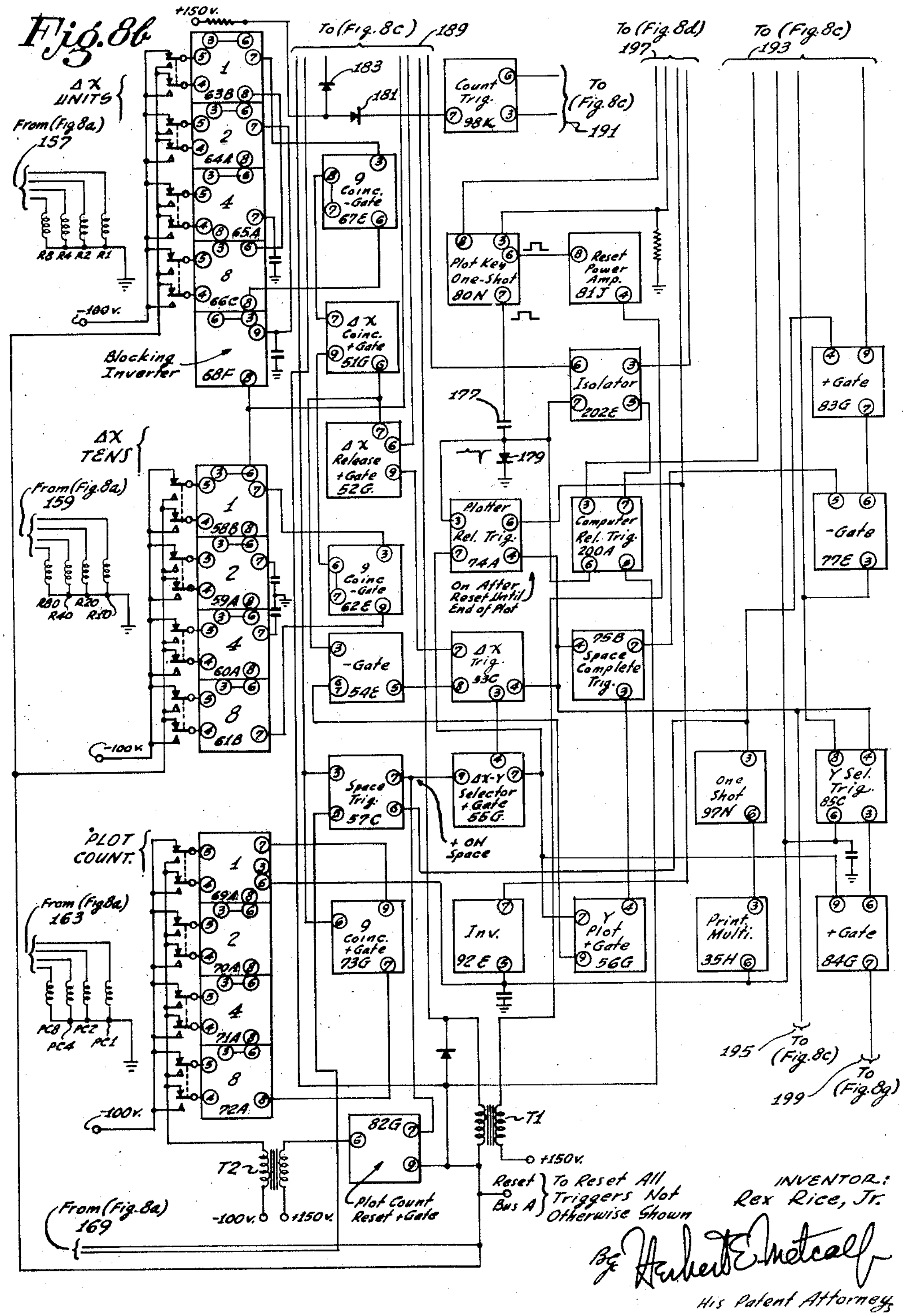

An adapter unit is required for card reader or punch operation. Figure 8*e* shows a punch adapter for punch operation of the plotter. Means are provided in a similar calculator adaptation configuration to connect punch output to control the plotter. Two triggers, 235K and 237K for ΔX-tens and ΔX-units data, provide outputs (pin 8) which connect with switches S1 and S4 (Figure 8*c*), respectively. Input signals to these two triggers are derived from punch card reading brushes which detect a punched hole in the ΔX data columns of a card. The position of a hole in a channel determines the time of appearance for a positive 40 volt trigger pulse. This trigger pulse input to a trigger will change the output (pin 8) condition from a negative (low) potential to a positive (high) potential level. Thus, positive output signals are provided on lines 201*a* and 201*b* to switches S1 and S4 which are sections of the ΔX selector switch 147. The manner in which these signals are utilized by the plotter will be described later.

The time that a ΔX punch trigger is triggered will produce suitable ΔX data pulses in the plotter from punch generated signals comprising a series of 9 input pulses from the punch emitter every transfer cycle. These pulses are provided to one-shot multivibrator 239H, the output of which is inverted by inverter 241E for positive pulses and connected to switch S2 and to rotary switch S16 which, in turn, is connected in punch position to condition the Y adapter gates 243G, 245G and 247G on pin 9. These gates are also connected (pin 7) to the outputs of Y adapter triggers 249K, 251K and 253K for the hundreds, tens and units channels, respectively. The input signals to the Y triggers are derived from card brushes which detect a punched hole in the Y data columns of a card. These trigger pulse inputs to a Y trigger will change the output (pin 7) condition from a positive (high) potential level to a negative (low) potential level. Thus, the time of appearance of a trigger pulse will permit the gating of a correct number of punch emitter pulses. These will appear as negative output pulses from the Y adapter gates on pin 4 thereof. The Y-hundreds gate output is provided to switch S9 (Figure 8*d*) on line 257*a*, the Y-tens gate output to switch S10 (Figure 8*f*) on line 261, and the Y-units gate output provided to switch S11 (Figure 8*g*) on line 263. These signals are provided to the Y memory one-cycle storages described later.

Finally, a ΔX sign trigger 255K is required, the output (pins 8 and 7) of which is connected to switches S6 and S7 (Figure 8*c*) on lines 201*d* and 201*e*. A hole is provided in the sign column of a card when a negative feed is required. The impulse produces an input signal to turn on the sign trigger. A +40 volt reset line controlled from the punch is connected to all punch adapter triggers, as shown, to reset the triggers for each card. This reset line is also connected to switch S8 (Figure 8*d*) by line 257*b* to produce a suitable reset pulse in the plotter for punch operation thereof.

It is apparent that adapting means for connecting the digital plotter to a digital computer will also be necessary. Figure 9 illustrates means for adapting connection of the digital plotter with, for example, a well known type of electronic calculator. The start of a plot transfer cycle is at A2 time of the primary timer cycle (Figure 7). Plot program voltage is applied from the calculator at the start of the plot program for one full cycle (2A to 1B) of the primary timer cycle to plot inverter 207 on lead 265. The left plate of plot inverter 207 is made positive and the right plate thereof is negative for the plot program cycle.

Terminal line 4 from isolator 202E (Figure 8*b*) is connected to an input (pin 3) of a negative coincidence gate 203E having another input (pin 5) from the calculator for a negative test signal appearing at 3A time of the primary timer cycle. Output (pin 7) from the negative gate 203E at this time is high if the plotter is ready (computer release trigger 200A is on) so that terminal line 4 is negative. This positive output (pin 7) of gate 203E is provided to an input (pin 9) of positive coincidence gate 205G, this gate 205G having another input (pin 7) from plot inverter 207 which receives plot instructions from the calculator from the start of the plot program. The output (a negative 3A impulse) of positive coincidence gate 205G is derived from pin 4 if the gate 205G is correctly conditioned by plot inverter 207 and negative gate 203E, and is provided to an input (pin 3) of a transfer cycle trigger 209A which also receives a signal (on pin 6) from the calculator later (at 23AB time) to reset the transfere cycle trigger. Thus, transfer cycle trigger 209A is turned on and a positive output signal from (pin 7 of) the transfer cycle trigger is fed to inverter 211E (pin 5) and a positive delay trigger coincidence gate 213G (pin 9). The inverter 211E output (pin 7) is connected to a positive coincidence transfer gate 215G (pin 9) and to a negative coincidence reset gate 217E (pin 5).

The negative coincidence reset gate 217E has an input (pin 3) from the calculator to allow a gate output (from 3A to 8B time) to be applied to a reset section. The other input from inverter 211E, when negative, permits this positive output from the reset gate 217E to be applied to the reset section comprising a reset inverter 227, reset regulator 229 and a reset power amplifier 231, the positive reset pulse output of which is provided on terminal line 1 to the reset bus A (Figure 8*b*). A plot count reset inverter 233 receives signals on lead 267 as required from the calculator to provide a negative pulse to space trigger 57C (Figure 8*b*) through terminal line 2 for resetting the "plot count" counter (Figure 8*b*) when requested.

The transfer gate 215G has another input (pin 7) from a negative coincidence plot gate 219E whose positive output (pin 6) depends upon coincident negative inputs from the calculator (signal at 11AB time) and a plot signal from plot inverter 2037. A negative output signal from the inverter 211E (pin 7) indicating that the plotter is ready (transfer cycle trigger 209A is on) will prevent a (11AB time) positive voltage shift formed by the negative coincidence plot gate 219E from passing through the positive coincidence transfer gate 215G (pin 4) to the program delay trigger 221, which is part of the calculator circuitry, to turn on this trigger 221 thus delaying the plot cycle. The output of the negative coincidence plot gate 219E is also fed to an input (pin 7) of the positive delay trigger gate 213G whose output (pin 4) is supplied to program delay trigger 221. The positive voltage shift from the transfer cycle trigger 209A (pin 7) on the delay trigger gate 213G will allow the (11AB time) positive voltage shift from plot gate 219E to pass through delay trigger gate 213G to reset the program delay trigger 221 if it has been turned on and would not affect the trigger if it has not been turned on. The program delay trigger 221 has been detailed to show the modification to the calculator circuitry which consists only of provision for the addition of four isolation diodes 223.

Inverter 211E output (pin 6) is positive (from A3 to 23A time) and supplied to conditioning inputs (pin 6) of positive coincidence gate followers 225M, the other inputs of which are connected to the calculator entry channels for data. These gates 225M supply calculator information to the ΔX and Y memory storages (from 9A to 20A time). The same inverter 211E output (pin 6) is also provided to control the computer release trigger 200A (Figure 8*b*) on terminal line 3 for control thereof, turning off this trigger with the trailing edge of the signal. This trigger 200A in turn causes the condition of terminal line 4 connected to isolator 202E to become positive indicating the completion of the data transfer period and the beginning of plotting in the plotter. During the data transfer period, coaxial connector 1 supplies a series of nine negative A pulses derived from the calculator. Coaxial connectors 5 and 6 supply a series of negative B pulses each, the first pulse of a series appearing thereon at a correct time to produce nine complement numbers (ΔX data) from the pulses on coaxial connector 1. This operation is performed in the plotter as described later. Coaxial connector 7 provides a negative pulse as necessary to the plotter for ΔX sign control. Coaxial connectors 2, 3 and 4 provide series of negative pulses which represent Y units, tens and hundreds digits respectively obtained from the calculator data channels.

The different input sources are connected to the main body of the plotter through input switches 147 and 149. These switches are multiple wafer switches which are shown separately in Figures 8*c*–8*g*. The ΔX switches 147 comprise S1, S2, S4, S6, S7, S12 and S13 which are all ganged together. All other similarly depicted switches comprise the Y function switch 149 and are also mechanically ganged. These input switches connect the input sources with the ΔX memory, the Y memory and the controls and reset means as was shown in Figure 6*a*.

Keyboard operation can be selected by setting selector switches 147 and 149 (Figure 4) to the keyboard position. Referring now to Figure 8*b*, there are shown three four-stage binary counters labeled "ΔX-units," "ΔX-tens" and "plot count." Each counter is associated with a set of relay coils which are connected to respective groups of keys on hand keyboard K (Figure 8*a*). These relays establish the condition of the respective triggers of each counter as set by the keys on the hand keyboard. Relay coils R1, R2, R4 and R8 are associated respectively with the double poles connected to pin numbers 4 and 5 of the triggers correspondingly labeled 1, 2, 4 and 8 to indicate the decimal value thereof for the ΔX-units counter. When a coil R2, for example, is energized by the depressing of the ΔX-units 7 key in keyboard K, the poles of the trigger 64A of the ΔX-units counter are so connected that the reset pulse will reset the number 2 trigger in an "on" condition. The relay coils R10, R20, R40 and R80 are similarly associated with the respective triggers in the ΔX-tens counters and are operated by the ΔX-tens group of keys on keyboard K. In the same way, relay coils PC1, PC2, PC4 and PC8 are related to the plot count counter and are operated by the plot count set of keys on the keyboard.

A blocking inverter 68F connects the output of the "ΔX-units" counter with the input of the "ΔX-tens" counter. The output (pin 8) of the first stage 63B of the ΔX-units counter is also connected to an input (pin 6) of the last stage 66C to turn off this stage if it is on. Further, another inverter output (pin 9) is connected back to the second stage 64A to turn off this stage, the output (pin 8) of the third stage 65A being connected to a separate input (pin 3) of the last stage. In this way, the ΔX-units counter is limited to a capacity of nine for 9 input pulses thereto. A tenth input pulse to the ΔX-units counter will turn off the first stage, the output thereof turning off the last stage and the last stage going off preventing the second stage from turning on because of the above mentioned connections. The output from the last stage is supplied through the inverter 68F to turn on the first stage of the ΔX-tens counter and by preventing the second stage of the ΔX-units counter from coming on thus leaving this counter clear and ready for more input pulses. Since the ΔX maximum content is 99, it is only necessary to modify the ΔX-units counter in this manner. It is noted that the keyboard wiring to the control relays for these three counters produce a nines complement content in the counters for a key (number) selected on the hand keyboard.

The keyboard setting of the Y groups of keys comprise the Y memory for keyboard operation. Input switch 149 connects the Y function keys directly with control elements of the plotter.

For operation with a computer or punch, two sets of one-cycle storages are provided for the ΔX and Y functions. The digit channels of a computer such as a digital electronic calculator may be connected to both these sets of plotter storage units by setting the input switches to calculator position. The ΔX feed increment is governed by a set of two cascaded counters each having four binary stages. The input of each counter is connected to the calculator for parallel entry at 50 kc., through respective gates and adapter trigger units, the gates being conditioned to open when a plot signal is provided from the calculator. The two ΔX counters each operate with a nines complement content as nine (zero complement) coincidence counters and provide a storage maximum of 99 as required for ΔX spacing. Thus, zero is represented by 99 in the two cascaded counters and the number 99 is represented by zero in both counters. Provision is made to sample the ΔX-units and tens counters to sense when the two are at 99 (numerical value zero) to control the spacing circuits. The ΔX one-cycle storages are the ΔX-units and tens binary counters previously described for keyboard operation. Adapting units, however, are required for calculator (or punch) operation.

Figure 8C:
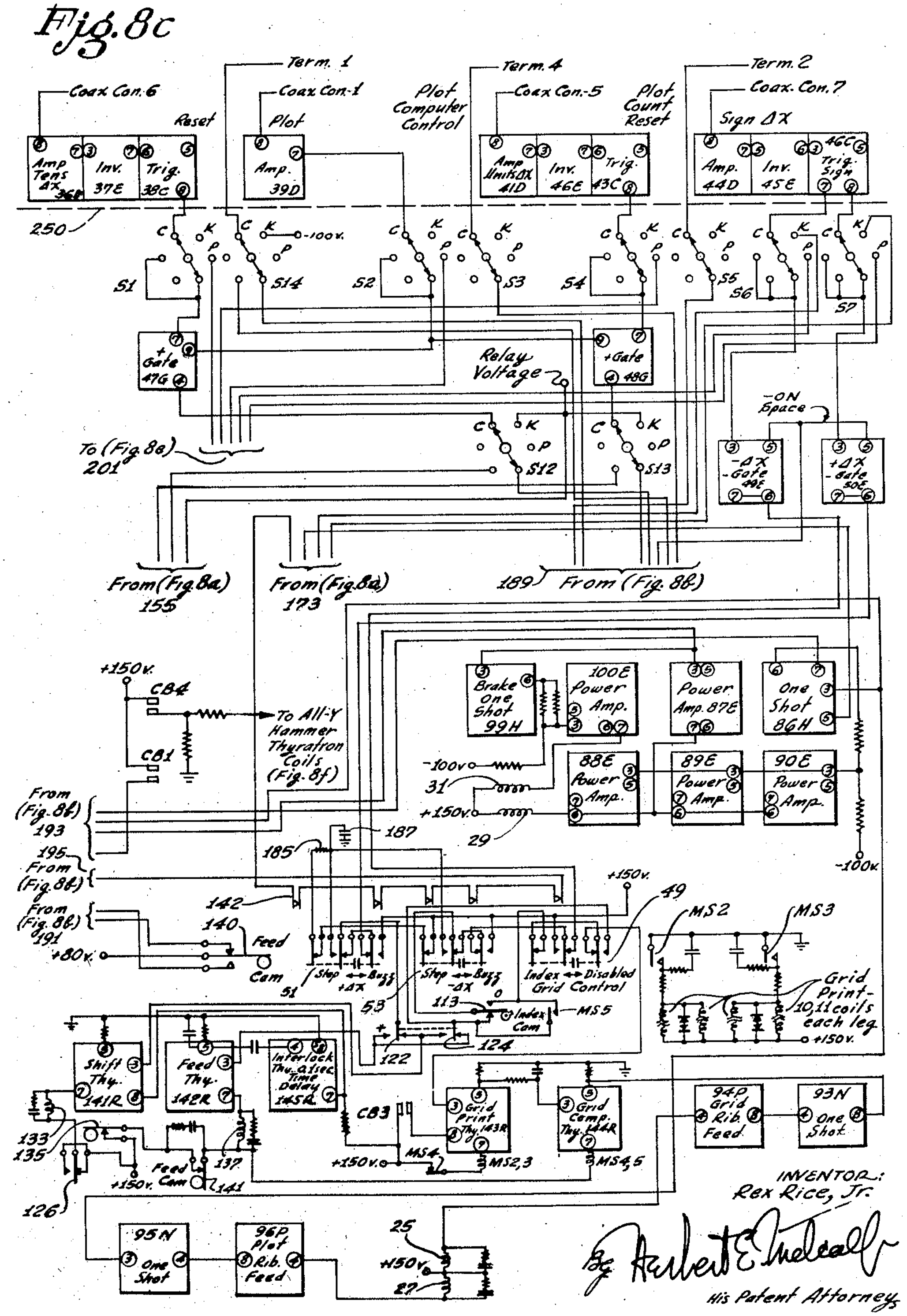

In Figure 8*c*, the ΔX one-cycle storage adapting units are shown. All equipment shown above dash line 250 are required only with calculator (or punch) operation. Each unit includes an amplifying stage, an inverter and a trigger. A coaxial connector 5 is connected to the calculator and supplies ΔX-units data therefrom. Similarly, another coaxial connector 6 provides ΔX-tens data from the calculator. The ΔX data consist of a series of negative B pulses starting on each connector line to represent a number sent over by the calculator. The appearance time of the first trigger pulse in each line is the important controlling factor because the triggers 43C and 38C have an input connection on one side (pin 6) only, such that succeeding pulses do not affect the trigger. Outputs from these triggers 43C and 38C are normally positive and connected through rotary switches S4 and S1 (part of ΔX switch 147) to condition positive gates 48G and 47G. The first data pulses will trigger negative the outputs of triggers 54C and 38C. Coaxial connector 1 from the calculator provides plotter digit signals comprising 9 negative A pulses (12A–20A time) every transfer cycle which are inverted through amplifier 39D and rotary switch S2 to both gates 47G and 48G. (These two units have the +150 v. removed from pin 3 but is applied through diode 183 on lead 189*c*). Gate inputs consequently are positive coincident signals which form a nines complement of the input number at a gate output due to the appearance time of the first data trigger pulse. Gates 48G and 47G negative output pulses are supplied through respective rotary switches S13 and S12 (of ΔX switch 147) to the inputs of the "ΔX-units" and "ΔX-tens" counters (Figure 8*b*).

There is a sign ΔX one-cycle storage which also includes an amplifier 44D, inverter 45E and trigger stage 46C. Data from the calculator is a negative pulse for a negative sign and is provided on coaxial connector 7. The sign trigger is reset every cycle and in the reset position will cause positive paper excursion. Therefore no impulse is sent to the plotter for positive paper feed and a pulse to the sign trigger is required for negative paper motion. Trigger 46C output is passed through rotary switches S6 and S7 (of ΔX switch 147) to negative gates 49E and 50E. The output (pin 6) from the ΔX release positive gate 52G (Figure 8*b*) is combined with sign ΔX output at gates 49E and 50E to control the amount and the direction of ΔX paper feed.

The Y ordinate function memory comprises a set of three counters arranged for parallel entry (50 kc., for example), from the calculator and are ten stage ring counters with the exception of the hundreds counter which only has four stages. The Y counters provide the necessary storage capacity of from 0 to 399.

Figure 8D:
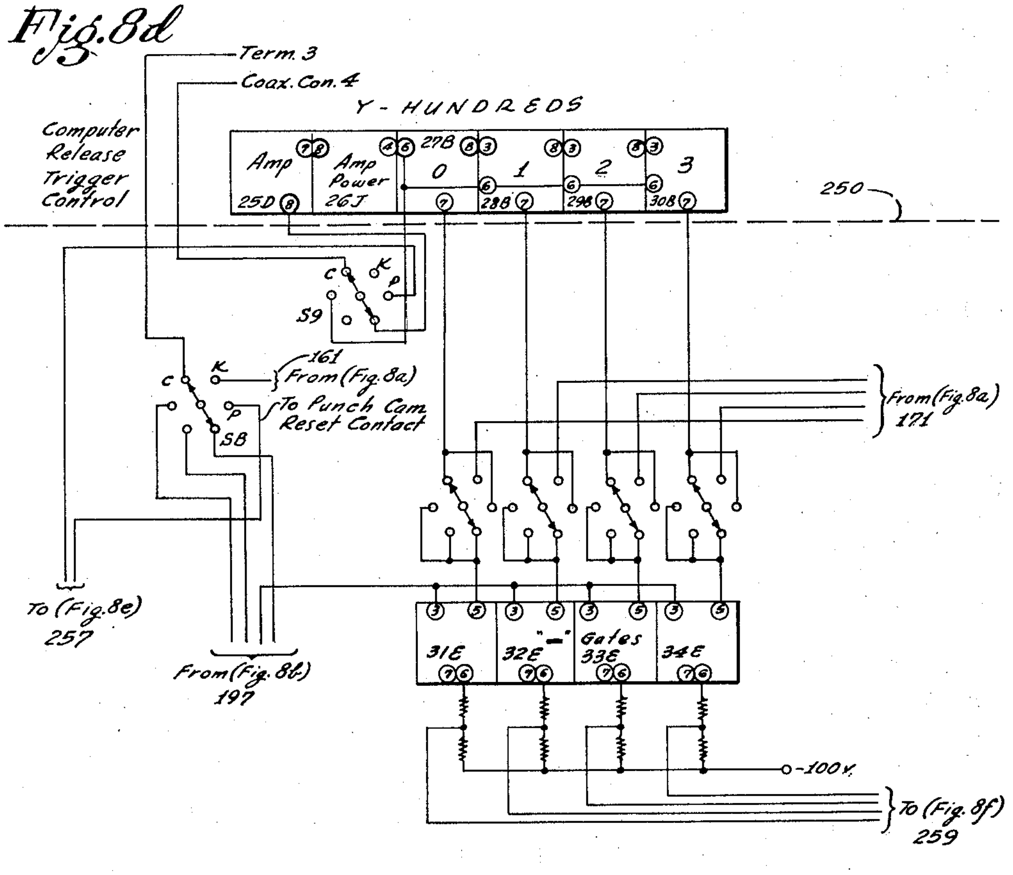
Figure 8E:
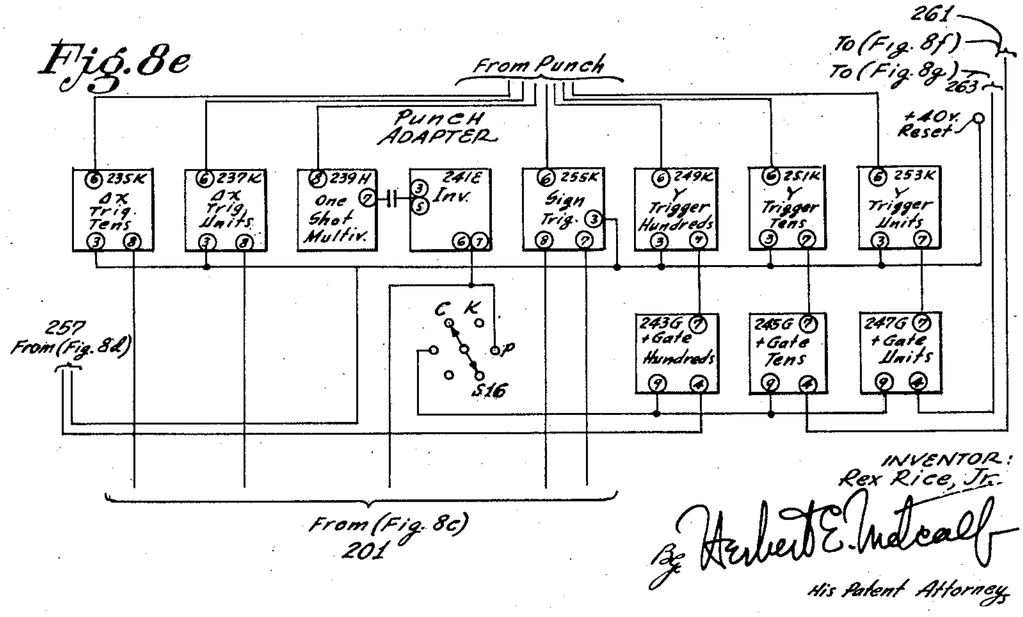

Figure 8*d* shows the Y-hundreds memory or storage which comprises an amplifier 25D, power amplifier 26J and four binary trigger stages to cover the hundreds selection of the possible 400 ordinate points. Input (a series of negative pulses) from the calculator is supplied through rotary switch S9 to the counter storage and outputs from each stage are provided through respective rotary switches to inputs of four negative gates 31E, 32E, 33E and 34E, the other input to the four gates being secured from print multivibrator 35H through inverter 92E (Figure 8*b*). The rotary switches connecting with the four negative gates are also connected to the Y-hundreds keyboard selector switches.

Figure 8F:
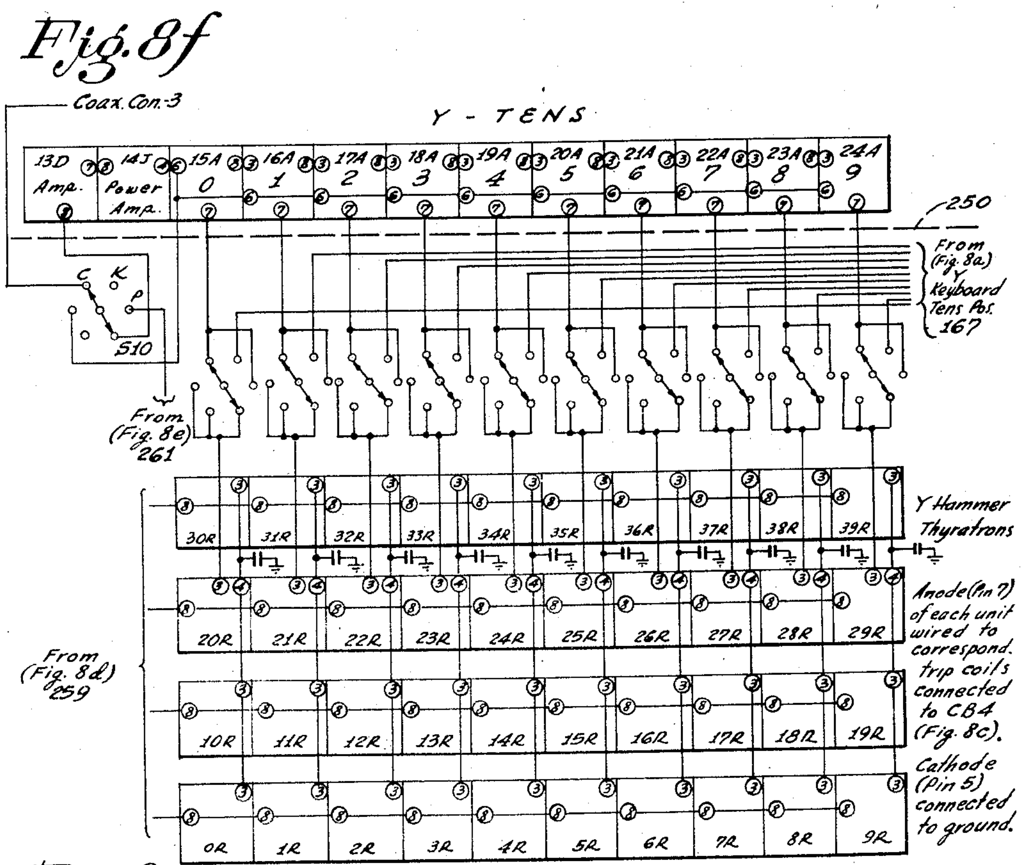

Figure 8*f* illustrates the memory or storage for the Y-tens digits received from the calculator. This section is similar to the Y-hundreds memory except that, of course, there are ten binary counter stages in addition to the amplifier 13D and power amplifier 14J stages. Calculator information is fed into the memory through rotary switch S10 connecting with the calculator by coaxial connector 3. Associated with each counter stage is a rotary switch connecting respectively with one of ten hammer thyratrons. The thyratron-counter connecting rotary switches also connect with the Y-tens selector keys on the keyboard (Figure 8*a*).

Figure 8G:
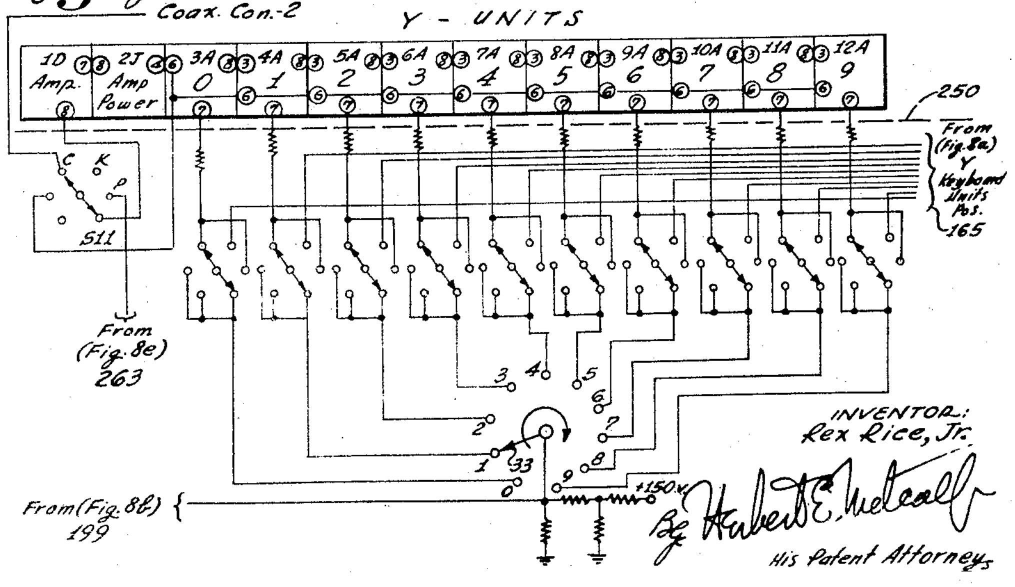

Finally, the Y memory includes the Y-units ten stage counter shown in Figure 8*g*. The Y-units memory or storage comprising input amplifier 1D, power amplifier 2J and ten binary stages receives data (negative pulses) from the calculator on coaxial connector 2 through rotary switch S11. The outputs of each counter stage is connected to individual contacts of a commutator 33 through separate contacts of the Y rotary switch as shown. The rotary switch contacts are also connected to the Y-units keys on the keyboard (Figure 8*a*) for hand keyboard operation.

The punch adapter unit proviously described provides suitable input signals to these same ΔX memory and Y memory when the input switches are positioned for punch operation.

Referring now mainly to Figure 8*b*, for calculator operation, the computer release trigger 200A is on, assuming that the plotter has finished the previous plot cycle. Computer release trigger control from the calculator is supplied on terminal line 3 and is a negative pulse (3A to 23AB time) provided through rotary switch S8 and isolator 202E to control the computer release trigger 200A. When computer release trigger 200A is on, the output signal to the calculator from isolator 202E (pin 6) is low at this time, this condition permitting a calculator transfer cycle when called for by the calculator. The calculator transfer cycle provides for the resetting of the ΔX and Y one-cycle storages in conjunction with the acceptance of input data from the calculator. Terminal line 4 provides plot computer control signals through rotary switch S3 from the computer release trigger 200A through isolator 202E. Terminal line 4 is high when plotting and low when the plotter is ready for a new set of information. Reset instructions consisting of a voltage rise for 120 microseconds (3A to 8B reset interval) is provided from the calculator on terminal line 1 through rotary switch S14 on line 189*b* to reset bus A. All the triggers connected to reset bus A are reset on pin 4 (i.e., reset off) except for triggers 46C, 27B, 15A and 3A which are reset on pin 5 (i.e., reset on). ΔX and Y function data is transferred between 9A to 20A time from the calculator to the plotter memory units along channels previously described.

After the above operation is completed, the trailing edge of the negative pulse on terminal line 3 provides an input signal on lead 197*d* to turn on plotter release trigger 74A through isolator 202E from the calculator. A suitable negative impulse is obtained from a capacitance 177 and diode 179 differentiator network. The output (pin 7) of isolator 202E is also connected to the computer release trigger 200A and will turn off this trigger. When plotter release trigger 74A is turned on, pin 7 thereof becomes positive (high). This output is the start signal provided to the paper space means and the Y-units digit selection means (Figure 6*a*) and indicates the beginning of plotting in the plotter.

For keyboard operation, after setting the keyboard input data, the plot key 43 (Figure 8*a*) is depressed to actuate a plot key one-shot multivibrator 80N whose pulse output is also differentiated for a negative spike (pulse trailing edge) by the capacitance 177 and diode 179 network to provide a suitable impulse input to the plotter release trigger 74A and the computer release trigger 200A. The plot key one-shot multivibrator 80N is similarly activated for punch operation, the keying action being performed by a punch cam contact providing a suitable signal on lines 257*b* and 197*a* to one-shot multivibrator 80N (on pin 8). The negative impulse to plotter release trigger 74A produces the start output signal as in calculator operation.

The pulse from the one-shot multivibrator 80N is also supplied to a reset power amplifier 81J, the output of which is transformed by a pulse transformer T1 for a positive pulse to reset the "ΔX-units" and "ΔX-tens" counters and all triggers connected to reset bus A. Reset bus A is also connected by lead 169*a* to storage reset switch 47 (Figure 8*a*) and to an input (pin 9) of plot count reset gate 82G.

There is also a plot count device, which is a four stage binary counter arranged for nines complement control as a nine (zero complement) coincidence counter. This plot count unit is shown in Figure 8*b* and employed for plotting a plurality of curves having a uniform ΔX spacing by suppressing ΔX spacing until a nine coincidence is reached in the plot count storage. The plot count storage in this particular embodiment is set only through the hand keyboard K.

Plot count reset instruction (a negative pulse) is provided from the calculator on terminal line 2 through rotary switch S15 connecting with the input of the space trigger 57C, and is used as a synchronizing signal. The output (pin 7) of space trigger 57C is connected to the input (pin 9) of a ΔX—Y selector positive gate 55G and also to the other input (pin 7) of plot count reset positive gate 82G. A reset line 189*b* providing reset signals from the calculator is connected to reset bus A and the former input (pin 9) of gate 82G, and the output thereof (pin 6) is coupled through a pulse transformer T2 to the reset terminals of the "plot count" counter. The outputs of the first and fourth stages of the "plot count" counter, however, are provided as inputs to a positive coincidence gate 73G, the output (pin 6) of which is supplied to an input (pin 3) of a space trigger 57C. Thus, the plot count storage is reset only when the output of the space trigger 57C is simultaneously high with a high input on pin 9 at 82G. This takes place when a plot rest signal is provided to the space trigger 57C from the calculator (pin 3) or keyboard (pin 5) or when a nine coincidence occurs in the first and fourth stages of the plot count storage which produces the necessary negative signal. Plot count reset switch 45 is connected to pin 5 of space trigger 57C through lead 169*b*. The space trigger 57C is reset on pin 6 near the end of each plot cycle to a low output voltage condition (space not required). If a nine coincidence is reached at the end of a plot cycle, space trigger 57C is turned on by the negative output (pin 6) of gate 73G. A positive output signal from gate 73G does not affect the space trigger 57C.

Outputs from the first and last stage of each of the ΔX four-stage modified binary counters are supplied to coincidence gates. The "ΔX-units" counter output from the first and fourth stages are provided to the inputs of a negative coincidence gate 67E. Similarly, outputs of the first and fourth stages of the "ΔX-tens" counter are supplied to the inputs of another negative coincidence gate 62E. The outputs of these two gates become the inputs to a ΔX coincidence positive gate 51G and the output (pin 6) of this latter gate is provided to an input (pin 7) of a ΔX release positive gate 52G and also provided to the input (pin 3) of another negative gate 54E. The ΔX—Y selector positive gate 55G is conditioned by the output (pin 7) of plotter release trigger 74A and the output (pin 4) of this gate 55G is provided as an input (pin 3) to a ΔX trigger 53C. This ΔX trigger has two outputs which are connected respectively to inputs of the ΔX release positive gate 52G and to the negative gate 54E, the output of which is directed to a Y plot positive gate 56G input (pin 9). When both inputs of the selector gate 55G are high, the outputs of the ΔX trigger 53C will be high to the ΔX release gate 52G and low for the negative gate 54E, respectively. Since the ΔX-units and ΔX-tens coincidence gates 67E and 62E have high level outputs only on nine coincidence, the ΔX coincidence gate 51G normally has a high output indicating spacing is required. Thus, when the output of this gate 51G is low, and is provided to condition negative gates 49E and 50E (Figure 8*c*) which determine paper feed direction, the paper shift and feed mechanism is actuated to properly position the paper.

A count trigger 98K is connected to the input of the first stage 58B of the "ΔX-units" counter through an isolation diode 181. The inputs to the count trigger 98K is provided by a feed cam-actuated switch (Figure 8*c*) to successively trigger and reset the count trigger. Another isolation diode 183 is connected to the same input of the "ΔX-units" counter for calculator input signals. The feed cam is actuated once for each space increment of .025 inch such that the ΔX counters become filled when the paper is correctly spaced. When this occurs, a nine coincidence is reached in the ΔX counters so that the output of the ΔX coincidence gate 51G becomes negative (low) and the output of the ΔX release gate 52G becomes positive (high) thereby stopping paper feed request. Since the output of the ΔX coincidence gate 51G is also connected to the negative gate 54E, this gate will provide a high output to Y plot positive gate 56G when ΔX spacing is complete and no longer requested. This is the paper space complete signal (Figure 6*a*).

The grid printing, ribbon feeds and paper feed mechanism is also schematically shown in Figure 8*c*. The paper feed control switches 51, 53 and the grid control switch 49 are shown in an unactuated condition. In the schematic shown, the poles of a switch are moved only on one side of the double line lever symbol. For example, for the —ΔX switch, deflecting the switch in the step direction would open the left end contacts, move the center pole from one contact to the other and leave the right end contact configuration unchanged. Deflecting this switch in the buzz direction, however, would leave the left two contacts unchanged but would cause the right end pole to break from the contact shown and make with the other. A resistance 185 and capacitance 187 combination is connected to the paper feed control switches to provide stepping pulses. Adjacent to these switches are shown the feed cam-actuated switch 140 which provides inputs to the count trigger 98K, two shift control switches 122 and 124 which are actuated by bracket 131 (Figure 3), and the index switch 113. There is also a grid complete switch MS5 connected across the index switch contacts as shown. Five interlocking switches 142 (mechanically actuated) prevent incorrect resetting of space and print control triggers.

The two shift control switches are shown in the negative paper feed position. Outputs therefrom are connected to a shift thyratron 141R and a feed thyratron 142R. The feed thyratron is conditioned by the output condition of the shift thyratron 141R and the shift thyratron is also conditioned by the output condition of the feed thyratron 142R, which output is, however, delayed by an interlock thyratron 145R. This delay insures that a previous feed operation is completed before shifting is started. The shift latch coil 133 is connected in series with the third shift control switch 126 in the output of the shift thyratron 141R to +150 volts. Whenever this switch 126 is actuated in shifting, it stops conduction of the shift thyratron by momentarily cutting off the +150 volts to the plate. Similarly, the feed latch coil 137 is also connected in series with a feed cam-actuated switch 141 (closed when feeding) and the interlocking shift cam-actuated switch 135 to +150 volts. This latter switch is normally closed except when shifting.

The grid is printed by the actuation of the MS2 and MS3 points. Closure of these points fires 42 grid print thyratrons (not shown) to energize the 42 grid hammer coils of which there are 10 connected in two legs and 11 in two other legs. Selenium rectifiers for contact arc suppression are connected to shunt the coils across each leg as shown. The MS2 and MS3 points are operated when grid print thyratron 143R is energized. This occurs when the index switch 113 contacts are cam-closed together with the timed closure of contacts CB3. The output of grid print thyratron 143R is connected to a grid complete thyratron 144R which, when excited, closes contacts MS5 and opens contacts MS4 in the plate circuit of the grid print thyratron thus extinguishing it. The MS5 contacts shunt the index switch points when closed to provide a complete path to the first two shift control switches 122 and 124. The output of grid complete thyratron 144R fires a grid ribbon feed one-shot multivibrator 93N connected to a grid ribbon feed amplifier 94P which, in turn, energizes the grid ribbon feed coil 25. Similarly, energizing of print multivibrator 35H (Figure 8*b*) would fire a plot ribbon feed one-shot multivibrator 95N which is connected to a plot ribbon feed amplifier 96P used to energize a plot ribbon feed coil 27.

Referring now to Figure 8*f*, there is shown an electronic matrix comprising forty thyratrons. The second row of ten thyratrons is directly connected on pin 3 to the respective outputs (pin 7) of the Y-tens counter. When this counter is properly filled, one stage will be on and thereby condition one of the thyratrons in the second row. Since pin 4 of the second row thyratrons are connected to pin 3 of the other rows, an entire column of thyratrons is suitably conditioned (i.e., each individual counter position conditions the column of four thyratrons directly under it, and as only one counter position can be on at one time, only one column of thyratrons is conditioned at any one time). The ten thyratons of the second row together with three other rows of ten form a control matrix for the forty hammers which print along the Y ordinate. The outputs of the Y-hundreds counter (Figure 8*d*) similarly is connected to four gates 31E, 32E, 33E and 34E on pin 5. The output of the Y-hundreds gates (Figure 8*d*) feed into a respective row of ten thyratrons on leads 259 while the Y-tens counter stages feed into respective columns (of four) hammer thyratrons. The anode (pin 7) of each unit is connected to corresponding trip coils of the hammers along the platen axis. The cathode (pin 5) of each unit is connected to ground through a suitable resistance. The thyratron numbers identify a hammer along the platen axis. Thus, one of forty thyratrons is selected by the condition of the Y-hundreds and Y-tens storages contents.

In Figure 8*g*, means for selecting the particular ordinate point to be printed by the established hammer is shown. The output (pin 7) of respective stages of the Y-units counter is resistively connected through the Y-selector switch to equally spaced contacts of a commutator 33 as shown. The wiper of the commutator 33 is connected to the positive gate 84G (Figure 8*b*) and to a voltage divider as shown. The wiper is rotated with the rotation of and stopped with the stopping of the platen (roller) on which is arranged the 400 symbol points in a spiralling configuration. Since there are 40 identical sections on the platen, each section having ten symbol points equally spaced around the roller circumference in a helix and corresponding with a particular contact of the commutator, the content of the Y-units counter determines the particular symbol point of a section to be printed whereas, the thyratron matrix described above determines the correct section and hammer along the Y ordinate.

The same output from the plotter release trigger 74A (start signal) which is supplied to an input (pin 7) of the ΔX—Y selector positive gate is also provided to another input (pin 7) of the Y plot positive gate 56G (Figure 8*b*). The output (pin 4) of this latter gate is connected to a space complete trigger 75B, the output (pin 7) of which is fed to a negative gate 77E together with the output (pin 8) of a Y-selector trigger 85C. The output of the plotter release trigger 74A (start signal) is also connected to a positive gate 84G which also has an input (pin 7) supplied from a Y-units commutator 33 (Figure 8*g*). This gate 84G provides an input signal to the Y-selector trigger 85C. Thus, the Y-selector trigger 85C will provide an output which is low when the inputs to the positive gate 84G are both high. This latter output is simultaneously used to de-energize the Y latch coil 29 (latching the platen in the position indicated by the number in the Y-units counter) and momentarily energizing the brake coil 31 to stop the platen. This is the Y shaft positioned signal and is provided to negative gate 77E (pin 3).

The output of the space complete trigger 75B is low when triggered by the output from the Y plot gate 56G and is provided to negative gate 77E on pin 5. A high output from negative gate 77E is therefore provided to positive gate 83G and the output thereof (pin 4) is supplied to one-shot multivibrator 97N and to another input (pin 6) of the space trigger 57C when the other input (pin 9) to positive gate 83G is made high by the closure of a cam-driven switch (CB–1, Figure 8*c*). The cam is driven off the hammer drive shaft and is shaped such that an output is secured from the positive gate 83G at a time when the plot hammers are free to fire. The space trigger 57C is reset by the output from the positive gate 83G. The delayed output from one-shot multivibrator 97N (trailing edge) drives a print multivibrator 35H whose output is connected to the input (pin 6) of the first stage of the "plot count" counter, to the other input (pin 6) of Y-selector trigger 85C and to an inverter 92E. The plot count storage is increased a digit by this output and the Y-selector trigger 85C is also reset thereby energizing the Y latch coil 29 for holding. This allows the platen to start turning again, but it is the trailing edge of this pulse that actually flips the trigger 85C thereby allowing time for the hammer to fire before the platen starts to rotate. The inverter 92E output is provided back to an input (pin 6) of the platter release trigger 74A to turn off (reset) this trigger. This negative signal is also supplied on lead **197*c* to condition on the Y-hundreds gates 31E, 32E, 33E and 34E**, and comprises the hammer selection complete signal, thereby allowing the firing of the hammers.

For Y selection, brake one-shot multivibrator 99H is energized by the output (Y shaft positioned signal) of the Y-selector trigger 85C (Figure 8*b*) which, through lead **193*c*, also conditions the power amplifier 87E to de-energize Y latch coil 29. The brake one-shot multivibrator 99H excites a power amplifier 100E to energize brake solenoid 31** to stop the platen. The Y value can then be printed by hammer drive shaft actuation of the contacts CB1, CB4 and CB3. Contact CB4 fires the selected hammer thyratron and CB1 produces an output from gate 83G which triggers print multivibrator 35H. The last CB3 contact, of course, prints the grid. The same output (pin 6) from the print multivibrator 35H is used to initiate unlatching of the Y latch and resetting (turning on) of the computer release trigger 200A. One-shot multivibrator 86H (Figure 8*c*) is triggered by the positive output of print multivibrator 35H and the output thereof is used to energize three power amplifiers 88E, 89E and 90E. The three power amplifiers 88E, 89E and 90E actuated momentarily by one-shot multivibrators 86H are also connected to the Y latch coil 29 and are used to withdraw the latching armature normally held through holding power amplifier 87E. The trailing edge of the output (pin 7) of multivibrator 86H is the plot complete signal and is used to trigger on the computer release trigger 200A (Figure 8*b*) through lead 193*a* to prepare the plotter for the next plot cycle.

*Plotter operation*

The operation of the digital plotter will be more fully understood by examination of the attached charts which illustrate various phases of plotter operation. These charts are complete within themselves and are substantially self-explanatory.

The ΔX operation cycle is shown in Figures 11, 11*a*, 11*b* and 11*c*.

Figure 11:
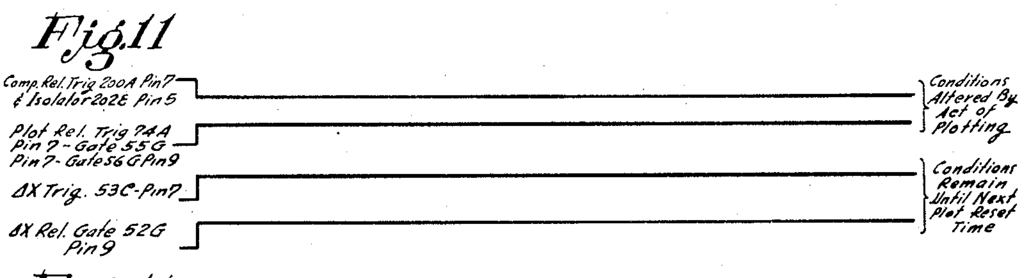

In Figure 11, the output (pin 7) of the computer release trigger 200A is low during plotting. This is shown by the first curve which is a plot of voltage and time as the independent variable. The second curve shows the condition assumed by plotter release trigger 74A in which the output (pin 7) thereof becomes high on plotting. Similarly, the next two curves show that pin 7 of ΔX trigger 53C and pin 9 of ΔX release gate 52G are at a high potential indicating that space is required. The condition of the last two elements remain the same until the next plot reset time.

Figure 11A:
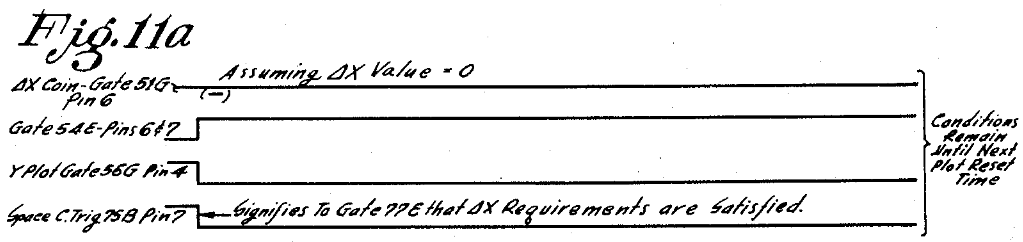

In Figure 11*a*, a ΔX value of zero is assumed. The output (pin 6) of ΔX coincidence gate 51G will therefore be negative in this instance. This is shown by the first curve in Figure 11*a* which indicates a negative (low) condition established before plotting. The negative gate 54E output (pins 6 and 7) will therefore rise with the rise of pin 7 of ΔX trigger 53C. The second curve of Figure 11*a* indicates this condition. The output (pin 4) of Y plot gate 56G is shown by the next curve to drop because this gate 56G will be in positive coincidence by the outputs of plotter release trigger 74A and negative gate 54E. Consequently, the space complete trigger 75B output (pin 7) is low as shown by the last curve of Figure 11*a* and signifies to gate 77E that ΔX requirements are satisfied and spacing is not requested at this time.

Figure 11B:
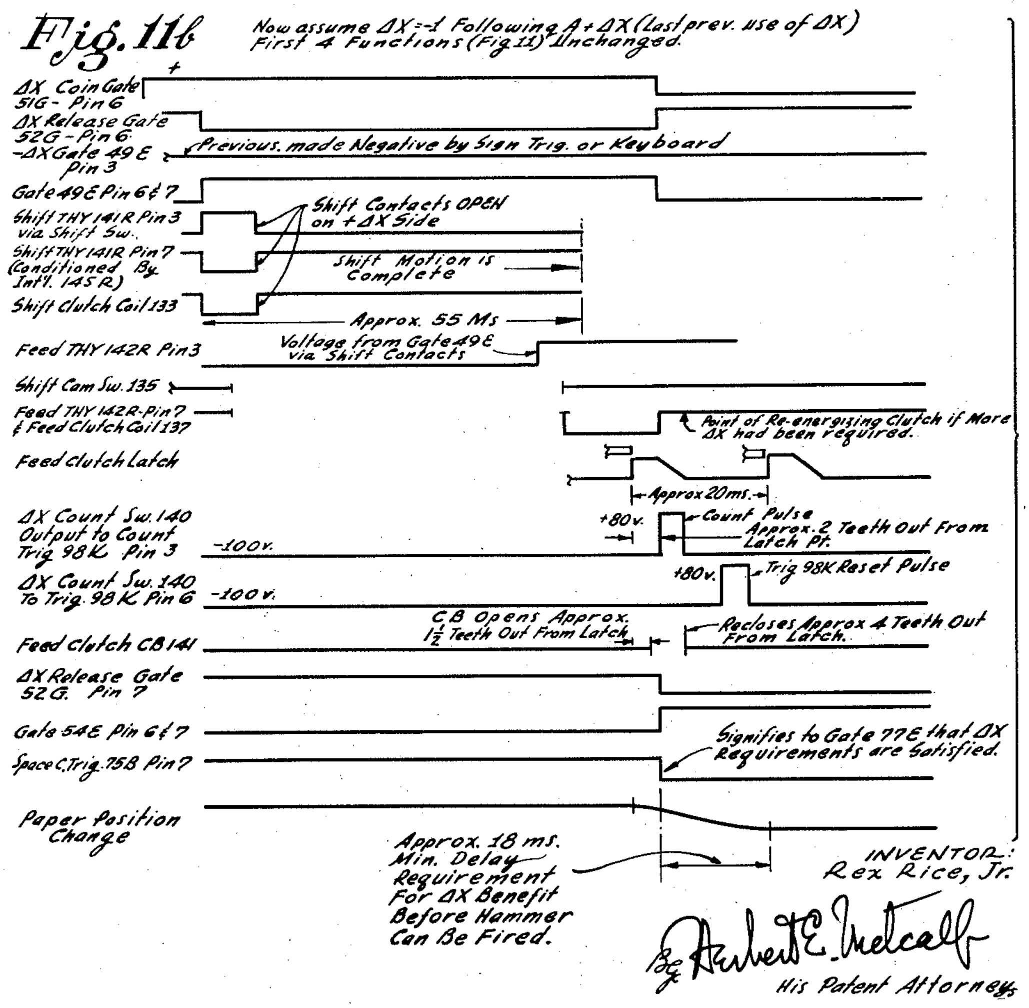

Figure 11*b* illustrates conditions occurring when a ΔX requirement of −1 is assumed following a previous use of a +ΔX. For this requirement, the four functions shown in Figure 11 is unchanged, however, ΔX gate 51G will not be in coincidence and pin 6 thereof will be positive indicating space is being required. This is shown by the first curve in Figure 11*b*. The next curve shows that ΔX release gate 52G (pin 6) drops with the rise (pin 7) of ΔX trigger 53C, and rises with the fall thereof. Pin 3 of gate 49E was previously made negative (third curve) by sign trigger 46C or through keyboard K; thus the output (pins 6 and 7) of gate 49E will rise with the fall of gate 52G (pin 6) and drop with the rise thereof, as illustrated by the fourth curve. Since the previous use is assumed to be a +ΔX, the shift contacts 122, 124 and 135 (Figure 8*c*) are in the positive (left) direction such that for a ΔX requirement of −1, shift thyratron 141R will be fired because of an input to pin 3 (fifth curve) and the output from pin 7 (sixth curve) is fed to shift clutch coil 133 for the time shown by the next (seventh) curve of Figure 11*b*. The shift contacts open as shown and assume the condition illustrated in Figure 8*c* a little later when shift motion is about completed. At this time feed thyratron 142R (pin 3) is energized as shown by the eighth curve. In the meantime shift cam switch 135 was opened (ninth curve) insuring and preventing feed thyratron 142R (pin 7) and feed clutch coil 137 from being energized until shift cam switch 135 closes. When feed clutch coil 137 is energized (tenth curve), the feed clutch latch (armature of relay 137, Figure 3) is withdrawn, as shown by the eleventh curve, from cam 89 permitting friction clutch 81 to drive gears 115 which has been positioned (shifted) to engage gear 87 until deenergized. The paper position change is correspondingly depicted in the last curve.

When gear 87 is rotated, the count switch 140 is actuated. This produces the count pulse and reset pulse to count trigger 98K as shown by the twelfth and thirteenth curves and opens the circuit breaking switch 141 (fourteenth curve). The count pulse produces a nines coincidence in the ΔX counters and ΔX release gate 52G (pin 7) becomes negative so that gate 54E (pins 6 and 7) rises (fifteenth curve) and produces an output (pin 4) from gate 56G. The output (pin 7) of space complete trigger 75B drops because of this and signifies to gate 77E that the ΔX requirements are satisfied.

Figure 11C:
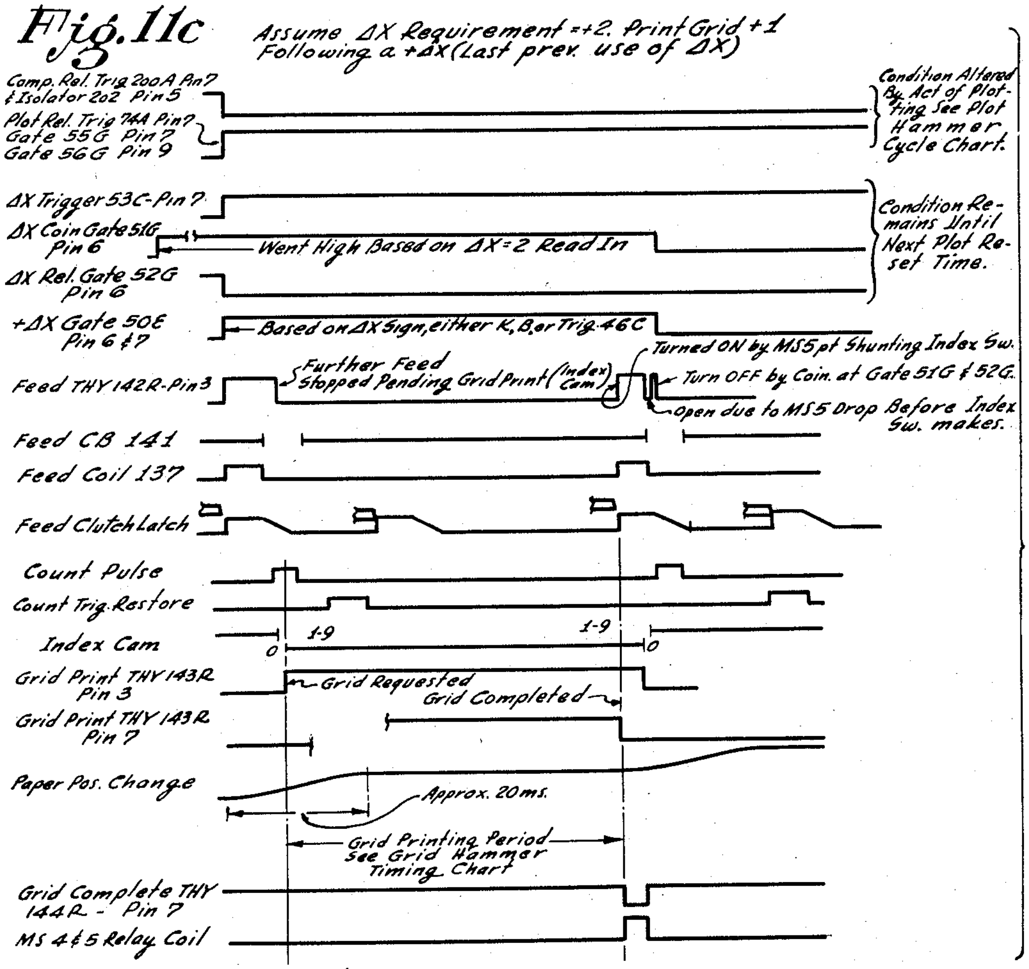

Referring now to Figure 11*c*, a ΔX requirement of +2 is assumed along with a +1 grid print following a last previous use of a +ΔX. The computer release trigger 200A, plotter release trigger 74A and ΔX trigger 53 are changed on plotting as shown by the first three curves of Figure 11*c*. The output (pin 6) of ΔX coincidence gate 51G went high before plotting by the read-in of ΔX=2 (fourth curve). Since trigger 53C (pin 7) and gate 51G (pin 6) are both high, ΔX release gate 52G (pin 6) is low (fifth curve). The next curve shows that the output of gate 52G is accordingly high based on a positive ΔX sign condition provided either through keyboard K or trigger 46C. Feed thyratron 142R (pin 3) is excited such that feed coil 137 is energized to raise the feed clutch latch. The thyratron 142R is turned off by the opening of the feed circuit breaking switch 141. The seventh, eighth, ninth and tenth curves illustrate this action. The count and restore pulses for trigger 98K are produced as shown in the next two curves. The action of the index cam is depicted by the thirteenth curve. The upper point of index switch 113 (Figure 8*c*) is identified by the curve section labeled "0" and the action of the lower switch point is identified by the curve section labeled "1–9." When the "0" curve section is made, grid is requested by energizing pin 3 of grid print thyratron 143R (fourteenth curve). The grid print thyratron 143R (pin 7) is fired when switch CB3 is actuated sometime during the broken section of the fifteenth curve. When the grid is completed, grid complete thyratron 144R and the MS4 and 5 relay coil is energized as shown in the last two curves of Figure 11*c*. The sixteenth curve illustrates paper position change for a ΔX requirement of 2.

Switch timing details of the paper feed system are shown in Figure 12. The bars indicate the time that a switch is closed. Reference is made to the 12 teeth gear (139, Figure 3) for time relation between the different switches. The feed clutch circuit breaking switch 141 is open from point 2 to point 4 of each feed cycle. The count switch 140 is closed between this interval and produces the count pulse to trigger 98K and the reset pulse is provided from point 8 to 11. The beginning point of the reset pulse is not critical. Index switch 113, however, operates once every 10 feed cycles and must break from the lower (Figure 8*c*) contact (1–9) after the count switch makes but before feed clutch circuit breaking switch 141 remakes at a point 4 of the tenth feed cycle, for example. When the upper (0) contact of index switch 113 is made, grid is requested and printed on the next interval during which time paper feed is stopped. At the beginning of the first cycle following grid print when the MS5 points are closed, the lower contact of index switch 113 is remade and the feed advances through 10 cycles again before grid is again printed. The break from the upper contact (0) must be made before clutch switch 141 breaks which would open the MS5 points.

The Y ordinate point select cycle is illustrated by Figure 13. The first three curves show the usual plot condition of the computer release trigger 200A, plotter release trigger 74A and an input (pin 9) of gate 84G. The next curve shows commutator 33 providing a pulse to another input (pin 7) of the coincidence gate 84G, assuming that the Y-units storage contains a "2" selection and Y-select trigger 85C is triggered at such time to de-energize Y latch coil 29 and firing the brake one-shot 99H as depicted by the fifth, sixth and seventh curves. It should be pointed out at this time that the latch being de-energized actually stops and positions the Y platen and the brake is used to help dampen the bounce of the ratchet against the Y latch. The Y latch ratchet will thus stop the platen at the desired "2" relation. Pin 3 of gate 77E drops in potential to signify that the Y selection is complete (last curve) when trigger 85C is triggered.

Figure 14 graphically illustrates plotter operation for the plot hammer cycle. It is assumed that the plotter is operating from the calculator C and both Y and $\Delta X$ values are provided. The first part (timewise) of the chart indicates the satisfaction of random functions, that is, Y-select and $\Delta X$ requirements. The computer release trigger 200A and plotter release trigger 74A outputs are respectively low and high for plotting and are returned to reversed output levels as shown by the first two curves. The third curve illustrates the output (pin 6) of gate 77E which rises with coincidence of inputs (pins 3 and 5) thereto. The fourth curve illustrates the resetting of the plot hammers cocked by the hammer reset cams and the next curve shows the similar opening of switch CB4 during these reset intervals. The sixth curve shows the actuation of switch CB1 and the length of the resulting pulse provided to the Y hammer thyratron coils. The seventh curve shows the output of coincidence gate 83G with an assumed starting point where Y-selection and $\Delta X$ requirements are satisfied. The next curve shows the output of the one-shot 97N connected to gate 83G and one-shot 97N (delay) is also used to trigger print multivibrator 35H as shown in the ninth curve. Inverter 92E and the hundreds gates are direct followers of the print multivibrator 92E output and behave as illustrated by the tenth succeeding curve. A hammer thyratron will be fired accordingly when CB4 is closed and one of the hundreds gates is in coincidence as illustrated by the eleventh curve. The last two curves show how the computer release trigger 200A is reset by the trailing edge of one-shot 86H output and of the pickup of the Y latch by energizing coil 29 and then holding until the next plot selection. The platen 11 is stopped when Y latch coil is de-energized.

Figure 15 illustrates plotter operation for the grid hammer cycle. The grid hammers are cocked as shown by the first curve. Thyratron 143R (pin 7) will be fired when grid has been requested and CB3 closes. The hammers will print right after the hammers are reset as shown by the next four curves. The last two curves illustrate the gradual rise in grid voltage of grid complete thyratron 144R due to output from thyratron 143R until it fires to energize the MS4 and 5 relay coils cutting off thyratron 143R and closing the MS5 contact points thus returning the plotter to the $\Delta X$ system for at least one more feed cycle when $\Delta X$ requirement is greater than one.

Timing details of the circuit breaking switches CB1, CB3 and CB4 are shown in Figure 16. These switches are cam-actuated by a cam 35 on the grid hammer reset shaft. It is noted that CB4 is open when the hammers are being cocked and therefore unable to fire. Switches CB1 and CB3 closure timing are both offset to compensate for delay inserted in the system to permit the platen and paper to settle before the hammers are fired.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

What is claimed is:

1. In a digital plotter, means for moving and stopping printing paper over a plotting surface, a printing head carrying a plurality of symbol elements and extending across the paper width at a right angle to the direction of paper feed, plot cycling means for selecting one of said elements in accordance with digital input information, and for printing the corresponding symbol each plot cycle, on the paper along said printing head, and control means connected to said paper moving means for suppressing paper feed a predetermined number of plot cycles for permitting multiple curve plots, said control means comprising digital counter means adapted to receive the nines complement of said predetermined number, and means for adding one to the input of said counter means for each plot cycle, whereby an output control signal is derived from said counter means for a number of counter inputs equal to the unfilled content thereof.

2. In a digital plotter, means for printing symbols in coordinate directions on paper supplied to said plotter, in successive plot cycles, and means for controlling said printing means in accordance with digital input information, said controlling means including means for storing the input information for a plot cycle, said storing means for information in one coordinate direction including parallel-fed multiple-stage binary ring counters having input connections for receiving the digital information, output gating connections with said printing means, and reset line means responsive to a reset signal pulse in the input to said plotter for resetting each said ring counter to zero.

3. In a digital plotter, means for moving and stopping printing paper over a plotting surface, means for printing on the paper any one of a plurality of ordinate symbols, in successive plot cycles, at a printing head extending across the paper width, and means connected to said paper moving means to vary the space increment of paper movement for each plot cycle, said space varying means including binary counter means adapted to receive nines complement data, and means for filling said counter means digitally for each paper feed increment, whereby an output control signal is derived for a counter input equal to said binary counter unfilled content.

4. A digital plotter, comprising: means providing a plotting surface; means for moving and stopping printing paper over said surface; a digital cylindrical, rotatable printing head extending across the width of said printing paper at right angles to the direction of paper feed and having a plurality of printing symbol elements thereon, said elements arranged in a continuous, multiple-turn spiral path spanning the printing width of said paper; means for orientating the rotative position of said printing head independently of said paper moving means; a plurality of printing hammers corresponding respectively with the number of complete turns of said symbol elements and positioned beneath said surface to strike said paper along said printing head; means for storing digital abscissa data representing paper spaced feed increment; means for storing digital ordinate data representing a selection of an angular rotative position of said printing head and a corresponding printing hammer; and control means for utilizing said stored digital data to position said paper feed means, said printing head orientating means and said printing hammer each plot cycle whereby ordinate values of an output function can be digitally plotted for selected space increments of said printing paper.

5. A digital plotter, comprising: means providing a plotting surface; means for moving and stopping printing paper over said surface; a digital printing head extending across the width of said printing paper at right angles to the direction of paper feed and comprising a plurality of printing symbol elements spanning the printing width of said paper; a plurality of printing hammers corresponding respectively with said symbol elements and positioned beneath said surface to strike said paper along said printing head; means for storing digital data representing paper space feed increment; means for storing digital data representing a selection of one of said symbol elements and a corresponding printing hammer; and control means for utilizing said stored digital data to actuate said paper feed means and said printing hammer each plot cycle, whereby ordinate values of an output function are digitally plotted for each space increment of said printing paper; and including, in addition, means for printing a reference grid at a predetermined space increment.

6. A digital plotter, comprising: means providing a plotting surface; means for moving and stopping printing paper over said surface; a digital printing head extending across the width of said printing paper at right angles to the direction of paper feed and comprising a plurality of printing symbol elements spanning the printing width of said paper; a plurality of printing hammers corresponding respectively with said symbol elements and positioned beneath said surface to strike said paper along said priniting head; means for storing digital data representing paper space feed increment; means for storing digital data representing a selection of one of said symbol elements and a corresponding printing hammer; and control means for utilizing said stored digital data to actuate said paper feed means and said printing hammer each plot cycle, whereby ordinate values of an output function are digitally plotted for each space increment of said printing paper; and including, in addition, means for suppressing paper feed a predetermined number of plot cycles whereby multiple curve plots are obtained.

7. Apparatus in accordance with claim 6 including, in addition, keyboard means connected to provide input data to said paper feed suppressing means for control thereof.

8. In a digital plotter having a multiple section, orientable printing head and associated printing hammers for each section, means for establishing an ordinate function point according to digital input data, comprising: respective storage counters for storing each digit of said input data and producing an output condition representing the digit content thereof; a matrix of coincidence means connected to all the outputs of said storage counters except one containing the least significant position digit, said printing hammers connected to the output of respective coincidence means; and means for orienting said printing head according to the output of the storage counter containing the least significant position digit whereby an ordinate function point can be printed by said hammers.

9. Apparatus in accordance with claim 8 wherein said orienting means includes a commutator having contacts corresponding with symbol elements on said printing head, the output of the storage counter containing the least significant position digit being connected to said contacts, a commutator wiper successively engaging said contacts for an output signal, said printing head oriented with the actuation of said wiper, and means responsive to said output signal for halting said wiper.

References Cited in the file of this patent

UNITED STATES PATENTS

| | | |
|---|---|---|
| 491,557 | Heene | Feb. 14, 1893 |
| 2,172,511 | Johnson et al. | Sept. 12, 1939 |
| 2,229,696 | Engst | Jan. 28, 1941 |
| 2,278,409 | Armbruster | Apr. 7, 1942 |
| 2,403,006 | Lake et al. | July 2, 1946 |
| 2,651,400 | Young et al. | Sept. 8, 1953 |
| 2,658,106 | Hell | Nov. 3, 1953 |
| 2,712,128 | Woodruff | June 28, 1955 |

FOREIGN PATENTS

| | | |
|---|---|---|
| 843,035 | Germany | July 3, 1951 |
| 534,442 | France | Jan. 5, 1922 |